(12) United States Patent
Yokota et al.

(10) Patent No.: US 8,141,108 B2
(45) Date of Patent: Mar. 20, 2012

(54) DISK DEVICE FOR LOADING OF DISK

(75) Inventors: Kazuo Yokota, Tokyo (JP); Yo Kamei, Tokyo (JP); Takashi Watanabe, Chiba (JP)

(73) Assignee: TEAC Corporation, Tama-shi, Tokyo (JP)

( * ) Notice: Subject to any disclaimer, the term of this patent is extended or adjusted under 35 U.S.C. 154(b) by 95 days.

(21) Appl. No.: 12/849,587

(22) Filed: Aug. 3, 2010

(65) Prior Publication Data

US 2011/0283298 A1 Nov. 17, 2011

(30) Foreign Application Priority Data

May 12, 2010 (JP) .................................. 2010-110118

(51) Int. Cl.
G11B 17/03 (2006.01)
(52) U.S. Cl. ...................................................... 720/613
(58) Field of Classification Search .................. 720/613, 720/603, 610, 607, 612, 611, 608, 601, 616, 720/614, 605, 653, 676, 710, 717, 714, 713, 720/695, 728, 707, 706, 712, 622, 724, 723, 720/604; 369/30.78
See application file for complete search history.

(56) References Cited

U.S. PATENT DOCUMENTS

| | | | | |
|---|---|---|---|---|
| 5,805,552 A * | 9/1998 | Tozune et al. | ................. | 720/610 |
| 5,862,116 A | 1/1999 | Watanabe et al. | | |
| 5,878,012 A | 3/1999 | Watanabe et al. | | |
| 7,127,727 B2 * | 10/2006 | Hsu et al. | ...................... | 720/637 |
| 7,140,029 B2 * | 11/2006 | Chiou et al. | .................. | 720/613 |
| 2003/0117928 A1 * | 6/2003 | Choi et al. | .................... | 369/75.2 |
| 2005/0039199 A1 * | 2/2005 | Chiou et al. | .................. | 720/613 |
| 2008/0163271 A1 * | 7/2008 | Wang | ............................ | 720/601 |
| 2009/0113462 A1 * | 4/2009 | Matsumoto et al. | .......... | 720/613 |

FOREIGN PATENT DOCUMENTS

JP 7254199 A 10/1995

* cited by examiner

*Primary Examiner* — Allen Cao
(74) *Attorney, Agent, or Firm* — Seed IP Law Group PLLC

(57) ABSTRACT

A disk device includes a disk moving mechanism for moving a disk between loading and unloading positions. There is a reader/writer for recording or playback of data with the disk in the loading position. In the disk device, a housing includes a main containing region, having a first base wall, for containing the reader/writer. An intermediate containing region is disposed to extend from one side of the main containing region, for partially containing the disk moving mechanism, the intermediate containing region having a second base wall positioned higher than the first base wall, for space saving below. A peripheral containing region is disposed to extend from one side of the intermediate containing region, for containing a portion of the disk protruded from the intermediate containing region, the peripheral containing region having a third base wall positioned higher than the second base wall, for space saving below.

10 Claims, 30 Drawing Sheets

DISK DEVICE FOR LOADING OF DISK

BACKGROUND OF THE INVENTION

1. Field of the Invention

The present invention relates to a disk device for loading of a disk. More particularly, the present invention relates to a disk device which is loaded with a disk, and can be shaped in a compact size according to space saving.

2. Description Related to the Prior Art

A disk device or disk drive is an instrument in which an optical disk is rotated on a turntable by a spindle motor. An optical pickup or optical pickup head is shifted by a thread motor to record data to the disk at a high density, or to read data from the disk for playback. There are various uses of the disk device. For example, the disk device can be incorporated in an electronic device such as a computer main unit, or can be externally connected to the electronic device.

Examples of the disk device include a slot-in type and a tray type. In the slot-in type, a housing of the disk device has an insertion slot. The tray type includes a disk tray for loading the disk. In the slot-in type, a reader/writer for recording and playback is contained in the housing. The disk is inserted through the insertion slot in the housing for loading. In the tray type, the reader/writer is incorporated in the disk tray. The disk tray is movable between an open position and a closed position, and when in the open position, pulled out of the housing, and when in the closed position, contained in the housing. The disk is placed on the disk tray in the open position before the disk tray is moved in to the closed position.

The size of the disk device should be reduced in order to reduce the entire size of the personal computer. U.S. Pat. Nos. 5,862,116 and 5,878,012 (corresponding to JP-B 2956470 and JP-A 7-254119) disclose the disk device in which one side of the disk tray is cutout for partially protruding the disk externally. The housing is constituted by a body case or containing region and a cover. There is a space defined under the cover so as to enable incorporation of relevant parts by space saving. The body case contains the cover in the closed position and right and left guide rails for guiding movement of the disk tray. The cover covers the protruding portion of the disk beside the body case.

There is an attempt of further space saving even for the disk device of U.S. Pat. Nos. 5,862,116 and 5,878,012. For example, it is conceivable to reduce the width of the body case and enlarge the width of the cover where a lower space is defined. The right and left guide rails are disposed on sides of the body case for guiding movement of the disk tray. In a conventional structure, a lead screw for moving the optical pickup is disposed on the right side of the spindle motor. The thread motor for driving the lead screw is also disposed on the right side from the center of the spindle motor for the disk. The right guide rail is disposed between the thread motor and a right side wall extending from the cover of the body case. A problem arises in that reduction in the width of the body case makes it impossible to dispose the right guide rail, because a space between the right side wall and the thread motor is too small.

A direction of moving the optical pickup with the spindle motor may be changed to define a space with the right guide rail by separating the right side wall. However, the reader/writer will extend longer in the backward direction than the well-known structure if the lateral width of the disk device is maintained in changing the moving direction of the optical pickup. A problem arises in a size of the disk device will be great in the front-to-back direction.

SUMMARY OF THE INVENTION

In view of the foregoing problems, an object of the present invention is to provide a disk device which is loaded with a disk, and can be shaped in a compact size according to space saving.

In order to achieve the above and other objects and advantages of this invention, a disk device includes a disk moving mechanism for moving a disk between loading and unloading positions. There is a reader/writer for recording or playback of data with the disk in the loading position. In the disk device, a housing includes a main containing region, having a first base wall, for containing the reader/writer. An intermediate containing region is disposed to extend from one side of the main containing region, for partially containing the disk moving mechanism, the intermediate containing region having a second base wall positioned higher than the first base wall, to define a space below. A peripheral containing region is disposed to extend from one side of the intermediate containing region, for containing a portion of the disk protruded from the intermediate containing region, the peripheral containing region having a third base wall positioned higher than the second base wall, to define a space below.

The reader/writer includes a turntable mechanism for rotating the disk. There is a pickup for recording or playback of data with the disk.

The housing further includes a first riser wall formed between the first and second base walls to extend erectly. A second riser wall is formed between the second and third base walls to extend erectly.

A center hole of the disk is disposed in the main containing region which contains over one half of the disk.

Furthermore, a rotating mechanism is disposed in the main containing region, engaged with the center hole, for rotating the disk.

The disk moving mechanism includes a disk tray, contained in the main and intermediate containing regions in a movable manner in and out, for supporting the disk placed thereon. First and second rails support lateral portions of the disk tray, and guide the disk tray between a closed position where the disk tray is contained in the housing to set the disk in the loading position, and an open position where the disk tray is pulled out of the housing to set the disk in the unloading position. The first rail is disposed in the main containing region, and the second rail is disposed in the intermediate containing region.

The reader/writer is disposed on the disk tray.

In one preferred embodiment, the disk moving mechanism includes a motor. A loading slider is actuated by the motor, for linearly moving in a direction of moving of the disk. A plurality of arms are caused to rotate by the loading slider, for contacting an edge of the disk entered through an insertion slot on a front side, to move the disk between the loading and unloading positions. The intermediate containing region contains the loading slider.

The intermediate containing region extends from a front surface of the housing to a rear surface thereof.

The housing includes a body case having the first, second and third base walls. An upper cover covers the body case.

The reader/writer includes a pickup for access to the disk for recording or playback. A carriage shifts the pickup in a radial direction relative to the disk.

The radial direction is from a center hole of the disk toward the unloading position thereof.

In one preferred embodiment, the radial direction is from a center hole of the disk toward the loading position thereof.

The housing includes a body case having the main containing region, the intermediate containing region and the peripheral containing region, and having a front opening directed to a front side. A front bezel is secured to cover the front opening. A cutout is formed in the front bezel by recessing one lower corner thereof in association with the second and third base walls.

The cutout is in an L-shape, and has first and second lower sides, the first lower side is positioned as high as the second base wall, and the second lower side is positioned as high as the third base wall.

In one preferred embodiment, a lower side of the cutout is positioned as high as the second base wall.

Consequently, the disk device can be shaped in a compact size according to space saving, because of the use of the main, intermediate and peripheral containing regions.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

1st Embodiment

Figure 1:
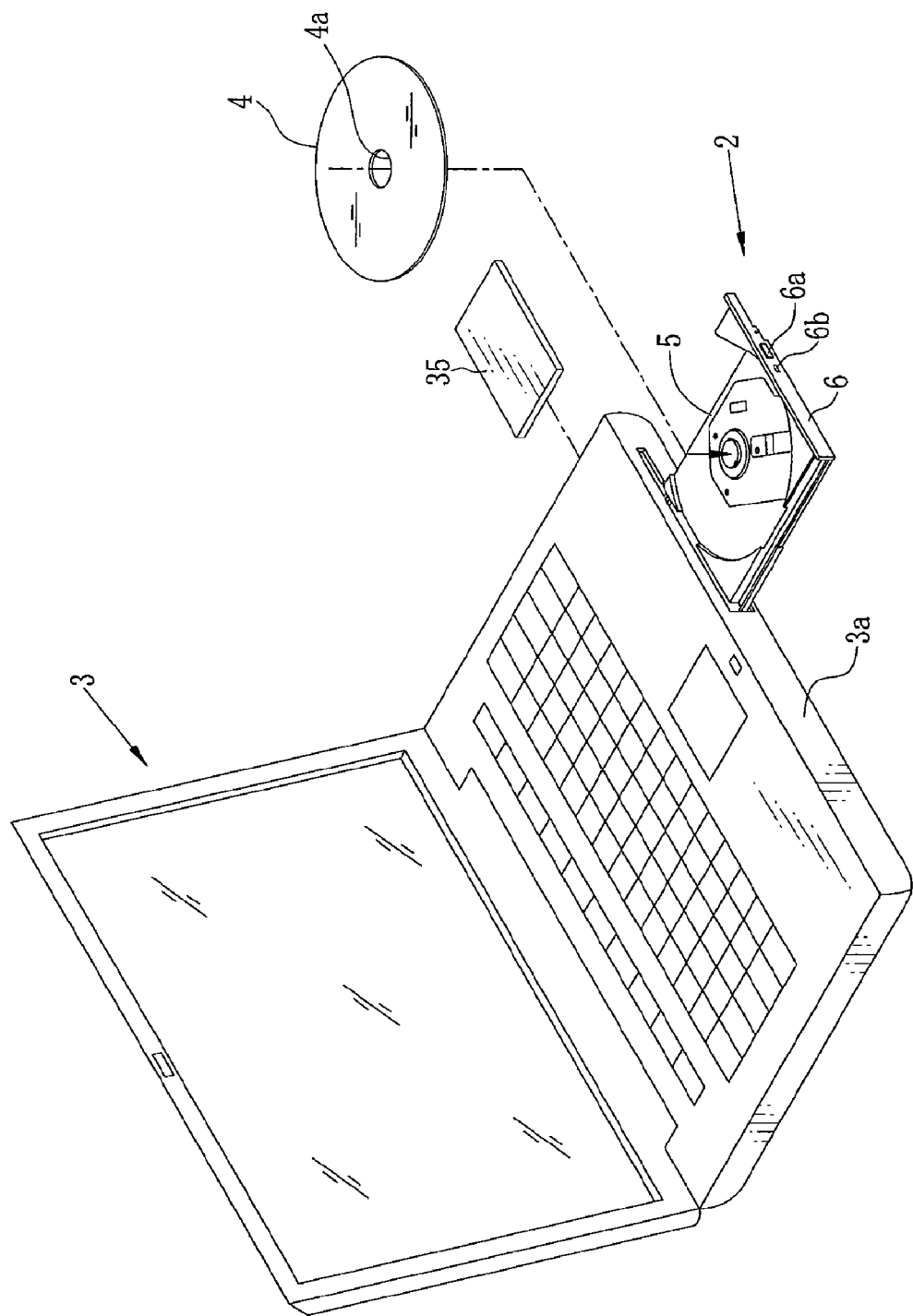
FIG. 1 is a perspective view illustrating a personal computer including a disk device of the invention.

In FIG. 1, a personal computer 3 of a notebook type includes a computer main unit 3a, in which a disk device 2 or a disk drive is incorporated. The disk device 2 includes a tray unit 5 or a disk moving mechanism, and a front bezel 6 or outer bezel attached to a front side of the tray unit 5. An optical disk 4 such as a CD or DVD is placed and supported on the tray unit 5. In FIGS. 2, 3, 4, 5, 6, 7, 8 and 9 for a first preferred embodiment, a housing 9 is included in the disk device 2 for containing the tray unit 5 in a manner movable in and out.

The housing 9 includes a body case 7 and an upper cover 8. Screws 10a, 10b, 10c and 10d fasten the upper cover 8 to the body case 7. The front bezel 6 includes an eject button 6a, an indicator 6b and an emergency hole 6c. The indicator 6b indicates information of an operating status of the disk device 2. The emergency hole 6c is adapted for receiving insertion of an external pin (not shown), and operates for unlocking the tray unit 5 in case of the emergency or failure in opening operation. The body case 7 has a structure of two steps. Also, the front bezel 6 has an L-shaped cutout according to the steps of the body case 7.

Figure 10:
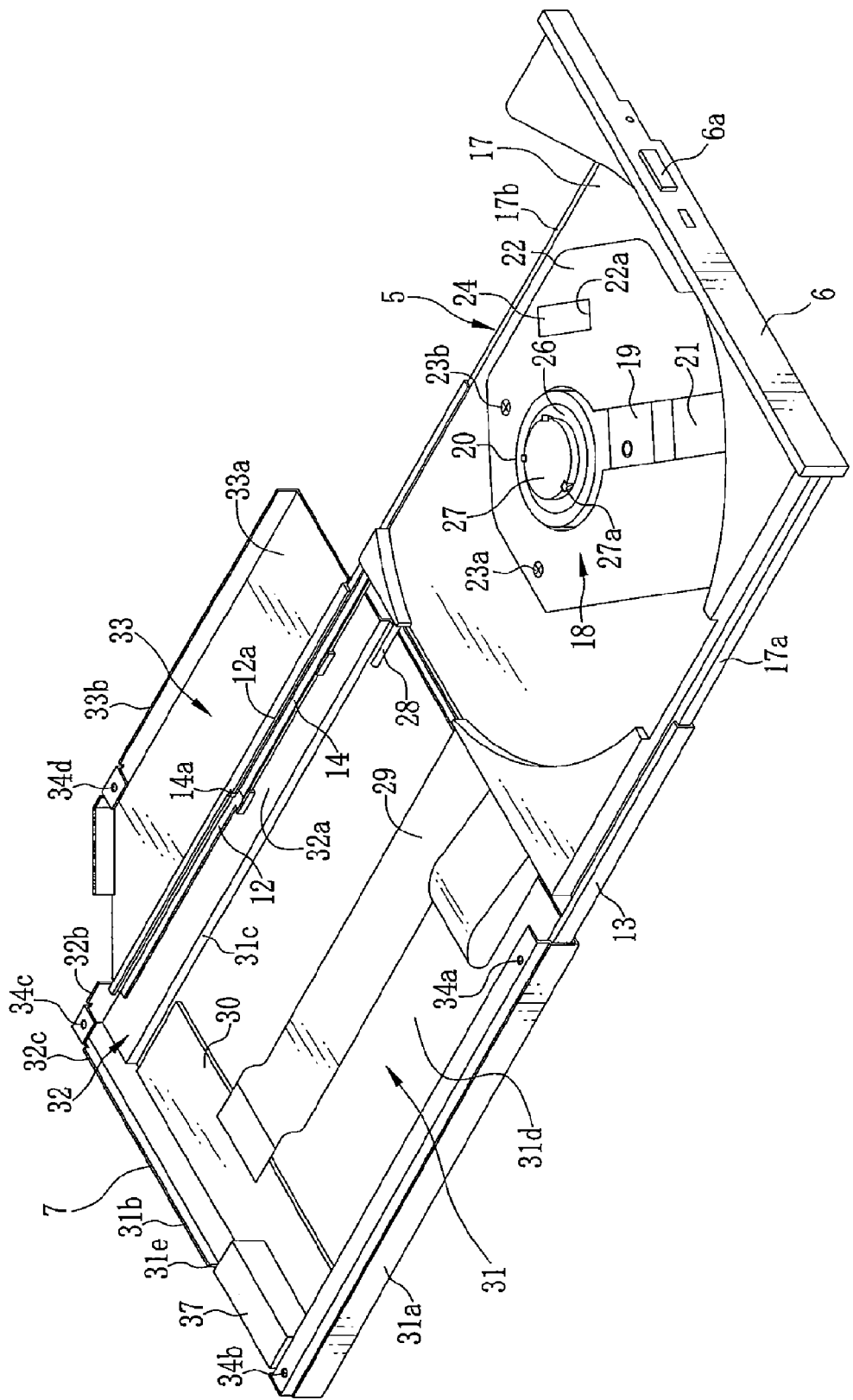
FIG. 10 is a perspective view illustrating the disk device in which a tray unit is in an open position.
Figure 11:
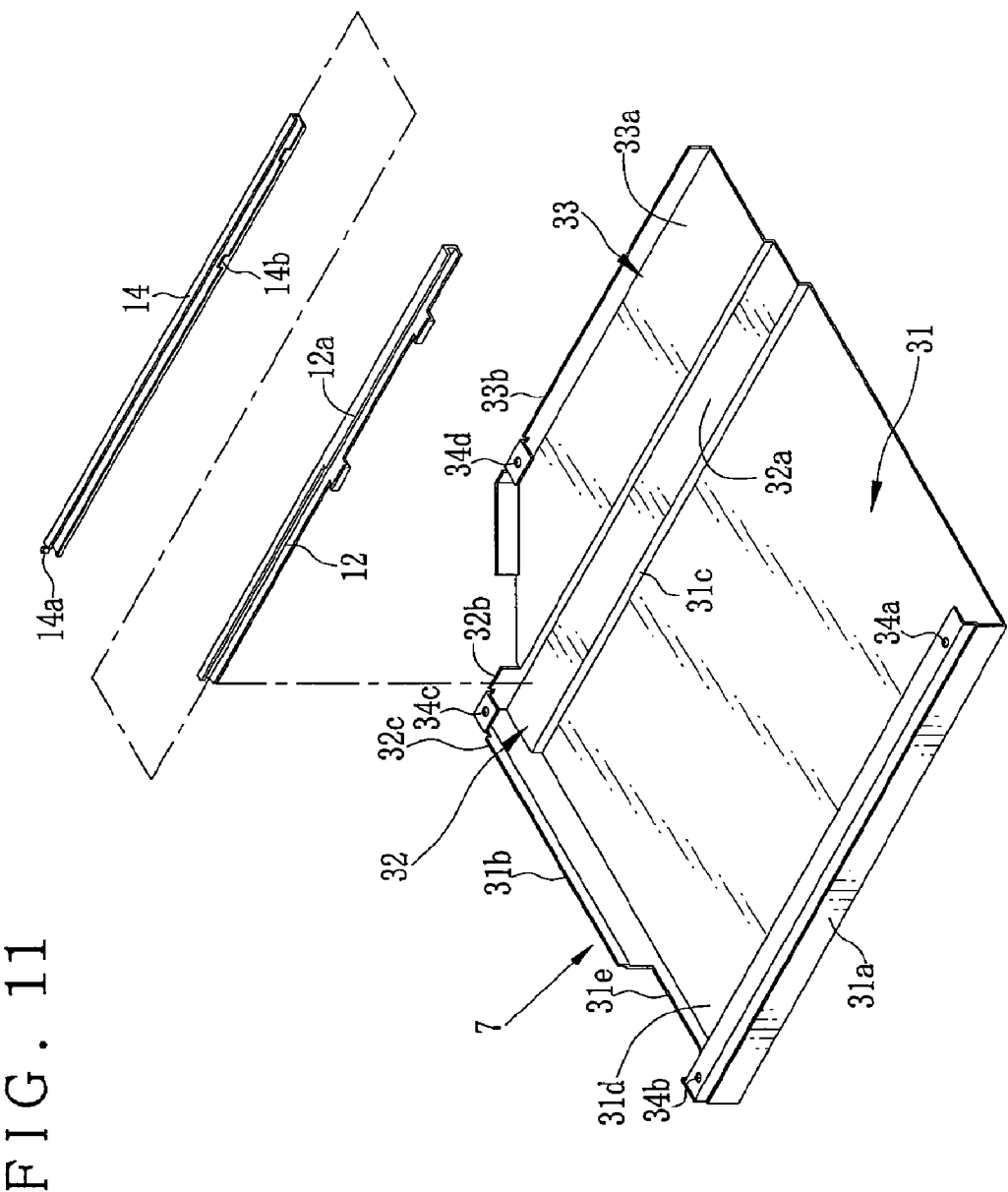
FIG. 11 is an exploded perspective view illustrating the disk device with a relationship between a body case, right guide rail and right slide rail.

In FIGS. 10 and 11, a left guide rail 11 and a right guide rail 12 are secured to lateral sides of the body case 7. A left slide rail 13 is engaged with the left guide rail 11 in a slidable manner. A right slide rail 14 is engaged with the right guide rail 12 in a slidable manner. A ridge 12a is formed with the right guide rail 12 and cooperates with a projection 14a for limiting slide of the right slide rail 14 in an unloading direction. The left guide rail 11 and the left slide rail 13 are constructed in a manner similar to the right guide rail 12 and the right slide rail 14.

Figure 2:
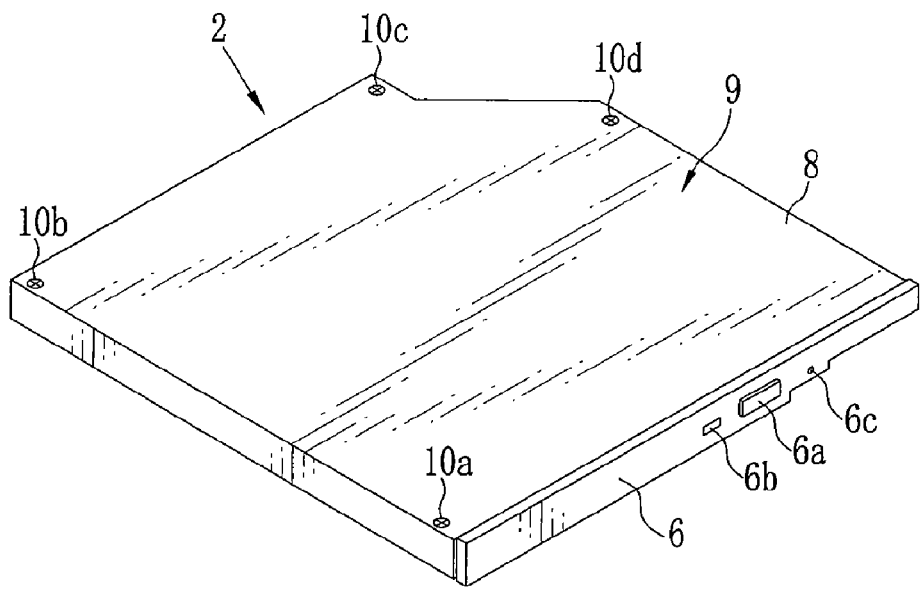
FIG. 2 is a perspective view illustrating the disk device.
Figure 3:
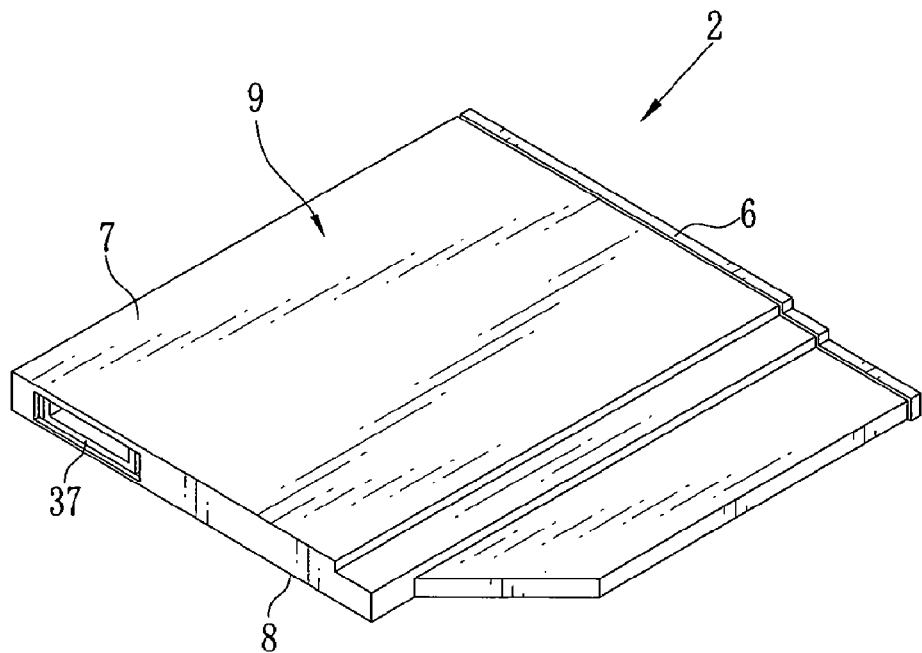
FIG. 3 is a bottom perspective view illustrating the disk device.
Figure 4:
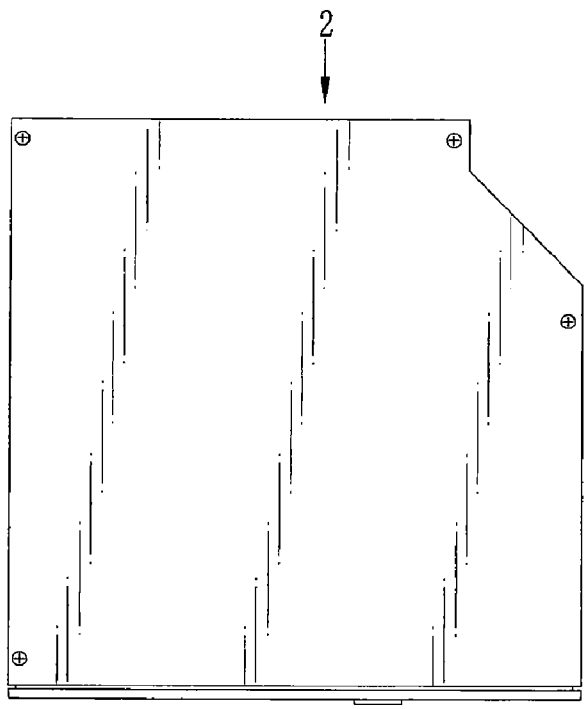
FIG. 4 is a plan illustrating the disk device.
Figure 5:
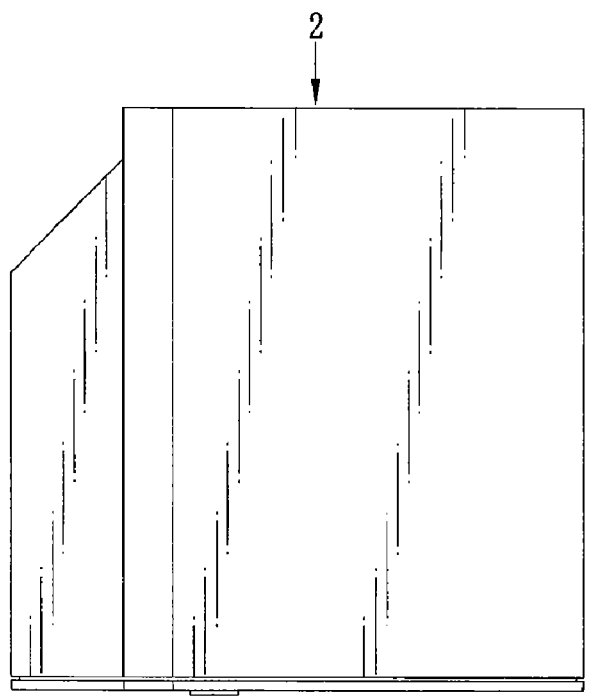
FIG. 5 is a bottom plan illustrating the disk device.
Figure 6:
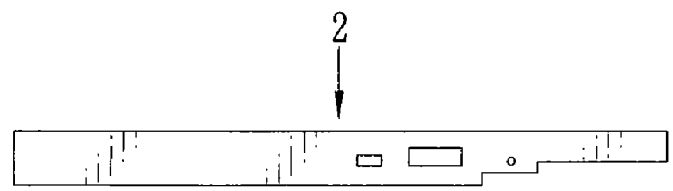
FIG. 6 is a front elevation illustrating the disk device.
Figure 7:
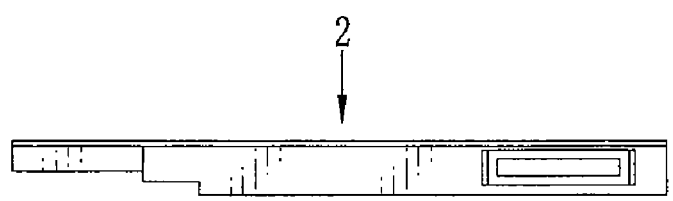
FIG. 7 is a rear elevation illustrating the disk device.
Figure 8:
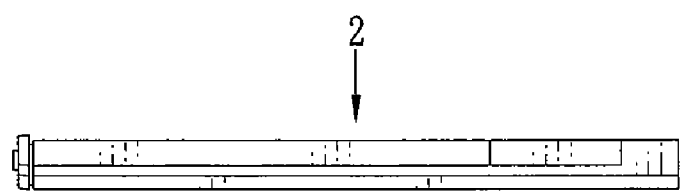
FIG. 8 is a right side elevation illustrating the disk device.
Figure 9:
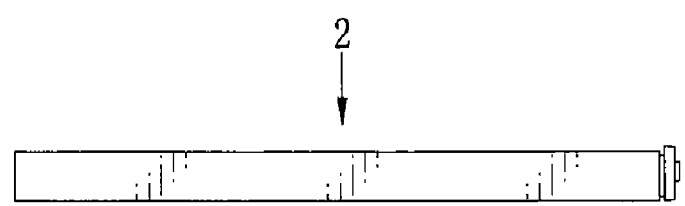
FIG. 9 is a left side elevation illustrating the disk device.

The tray unit 5 is supported movably relative to the right and left slide rails 13 and 14 between a closed position of FIG. 2 and an open position of FIG. 10. The tray unit 5, when in the closed position, is contained in the housing 9 to set the disk 4 in a loading position, and when in the open position, is pulled from the housing 9 to set the disk 4 in an unloading position. A projection 14b is formed with the right slide rail 14 and limits a movable range of the tray unit 5 in the unloading direction. The left slide rail 13 is structurally equal to the right slide rail 14.

The tray unit 5 includes a disk tray 17 or a disk moving mechanism, and a reader/writer 18. The disk tray 17 supports the disk 4. The reader/writer 18 records or plays back data with the disk 4. A right slide ridge 17b and a left slide ridge 17a are formed with the disk tray 17. The right slide ridge 17b is inserted in the right slide rail 14 and supported movably on a right side. The left slide ridge 17a is inserted in the left slide rail 13 and supported movably on a left side. Projections are formed with rear ends of the slide ridges 17a and 17b for contacting the projection 14b of the right and left slide rails 13 and 14.

The reader/writer 18 includes an optical pickup 19 or pickup head and a spindle motor 20 of a rotating mechanism for rotating the disk 4. A thread motor 24 moves the optical pickup 19 in a radial direction of the disk 4. There is a cover plate 22. Screws 23a and 23b fasten the cover plate 22 to the disk tray 17. A slide channel 21 is formed in the disk tray 17 to extend in the radial direction of the disk 4. The optical pickup 19 accesses the disk 4 through the slide channel 21, and records or plays back data with the disk 4 during rotation. An opening 22a is formed in the cover plate 22, through which the thread motor 24 appears.

The spindle motor 20 is attached to the disk tray 17. A casing contains the spindle motor 20, and has an upper wall which constitutes a turntable 26. A chuck head 27 of a rotating mechanism is formed with the turntable 26. When the disk 4 is placed and depressed, a center hole 4a of the disk 4 receives insertion of the chuck head 27 in a tightly fitted manner. Plural chuck claws 27a are incorporated in the chuck head 27, and biased with springs in an outward direction. The disk 4 is retained in a removable manner by use of the chuck claws 27a.

An ejector rod 28 or ejector pin is disposed on the disk tray 17 and movable forwards and backwards for ejecting the tray unit 5. A compression coil spring (not shown) is disposed to receive insertion of the ejector rod 28. When the tray unit 5 is moved toward the closed position, a rear end of the ejector rod 28 contacts a rear inner surface of the body case 7. The ejector rod 28 moves forwards in compressing the compression coil spring. When the tray unit 5 is locked in the closed position, the compression coil spring is in a biased state. Upon unlocking the tray unit 5, the compression coil spring causes the ejector rod 28 to push the tray unit 5 toward the unloading position.

A driving circuit board (not shown) is disposed on the disk tray 17 for driving the optical pickup 19, the spindle motor 20 and the thread motor 24. A control circuit board 30 is connected by a flexible wiring board 29 with the driving circuit board. There is a connector 37 for external connection of the control circuit board 30 to external devices.

Figure 12:
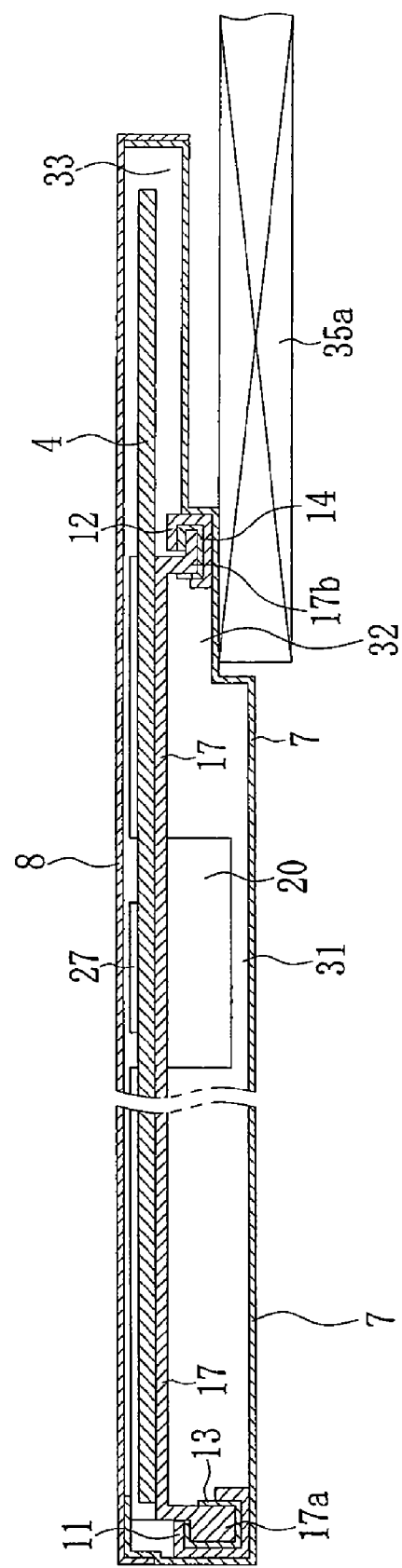
FIG. 12 is a cross section illustrating the body case.
Figure 13:
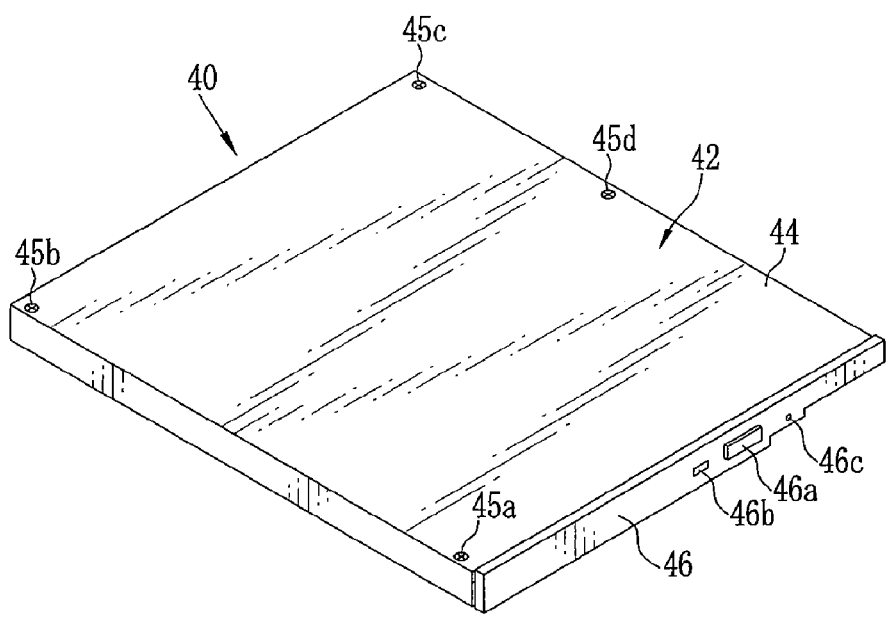
FIG. 13 is a perspective view illustrating a second preferred disk device with a difference in a direction of a reader/writer.
Figure 14:
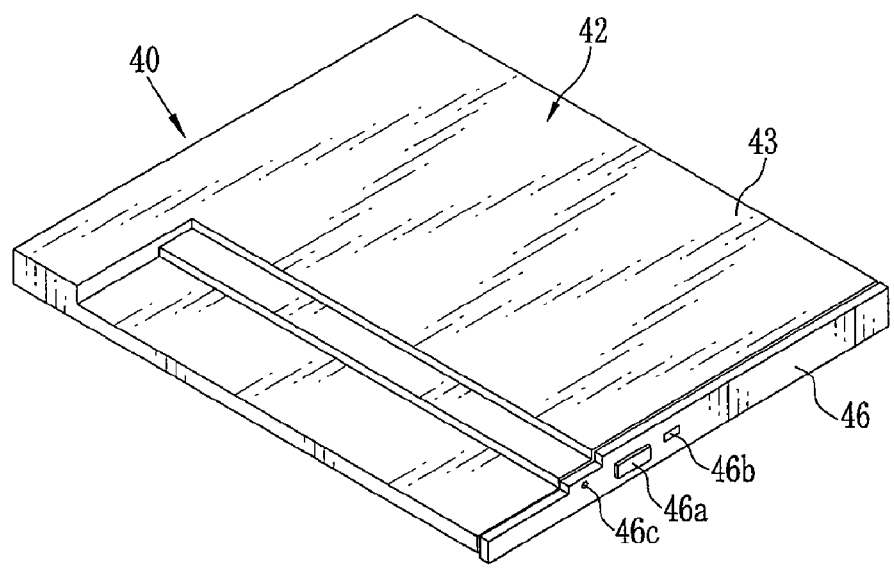
FIG. 14 is a bottom perspective view illustrating the disk device.
Figure 15:
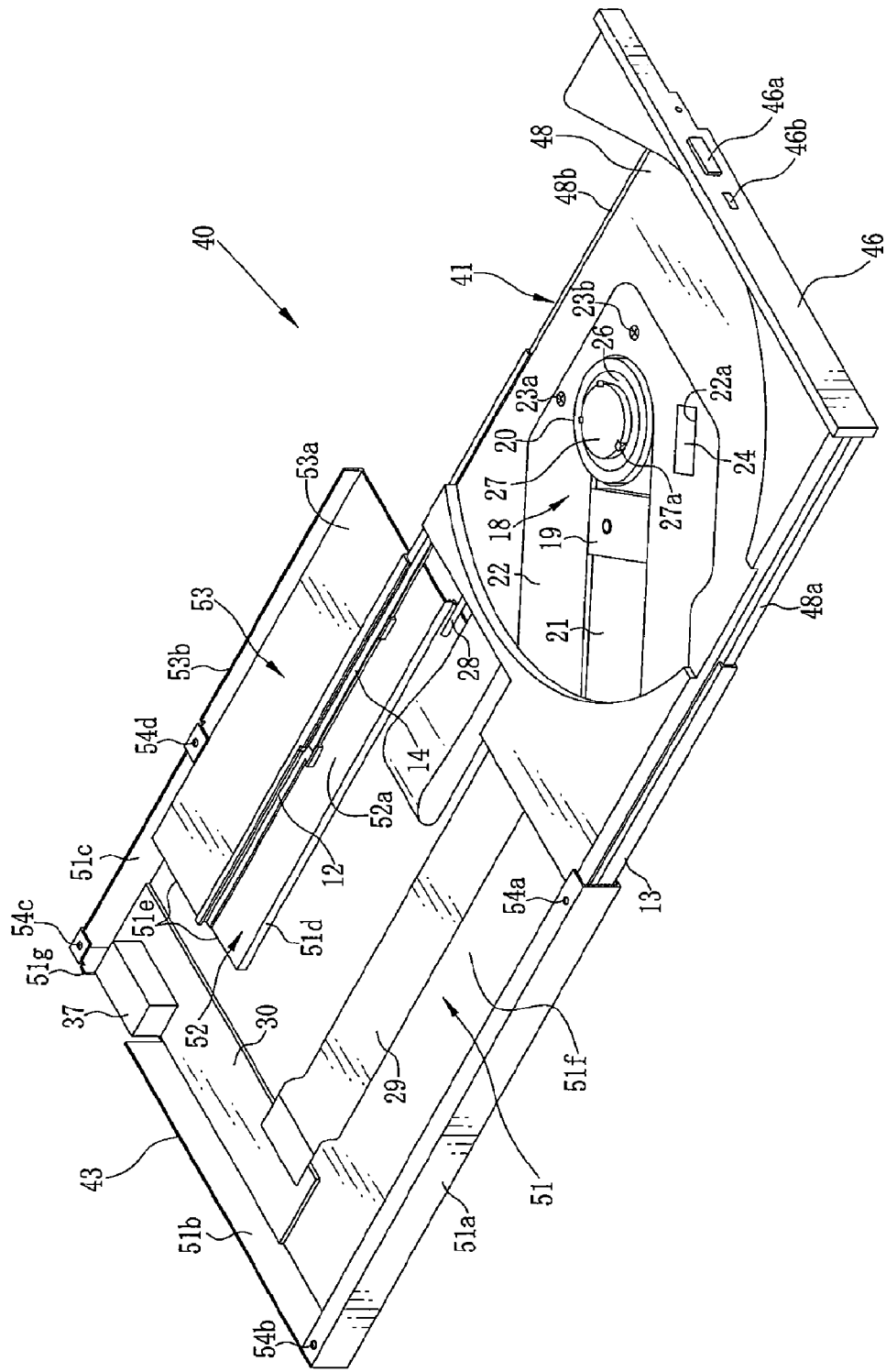
FIG. 15 is a perspective view illustrating the disk device in which the tray unit is in an open position.
Figure 16:
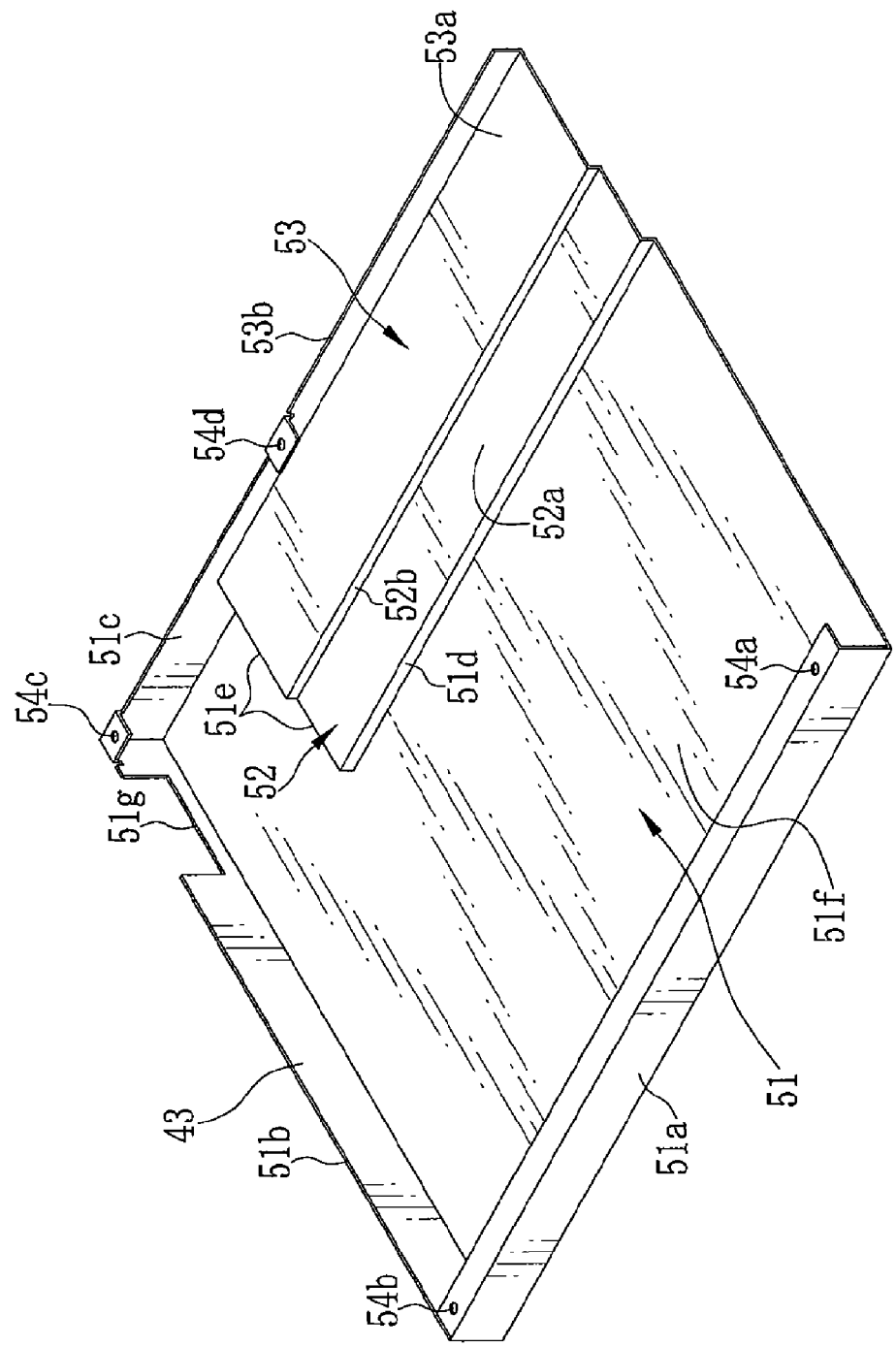
FIG. 16 is a perspective view illustrating a body case of the disk device.
Figure 17:
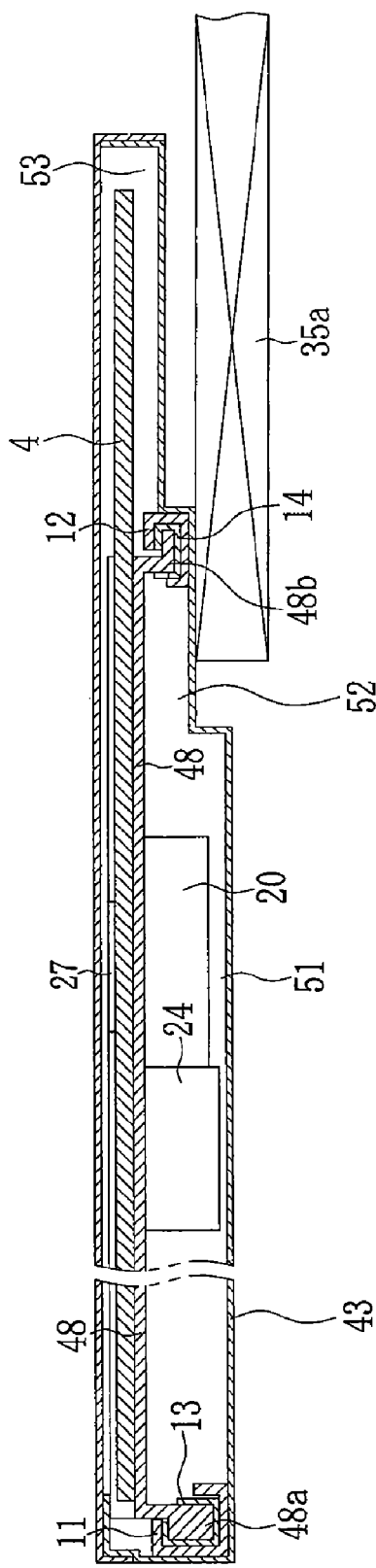
FIG. 17 is a cross section illustrating the body case.
Figure 18:
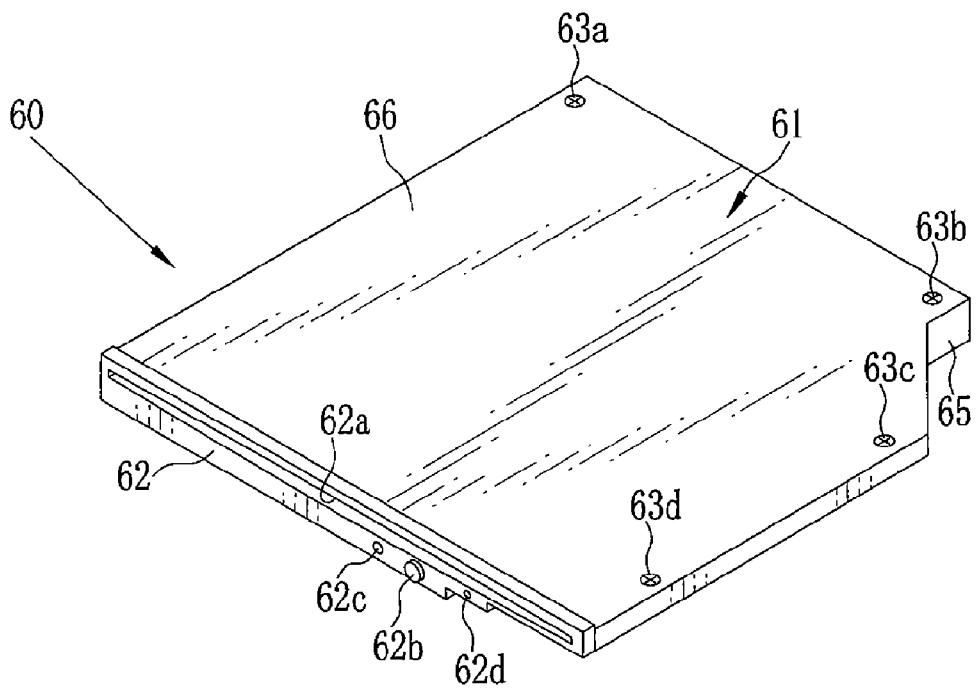
FIG. 18 is a perspective view illustrating a third preferred disk device of a slot-in type.
Figure 19:
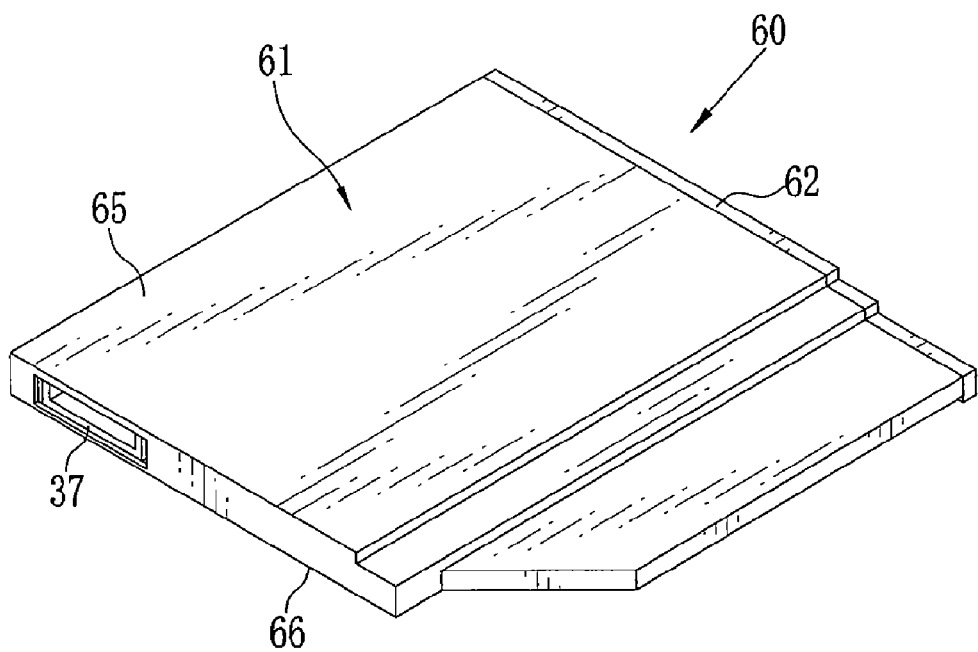
FIG. 19 is a bottom perspective view illustrating the disk device.
Figure 20:
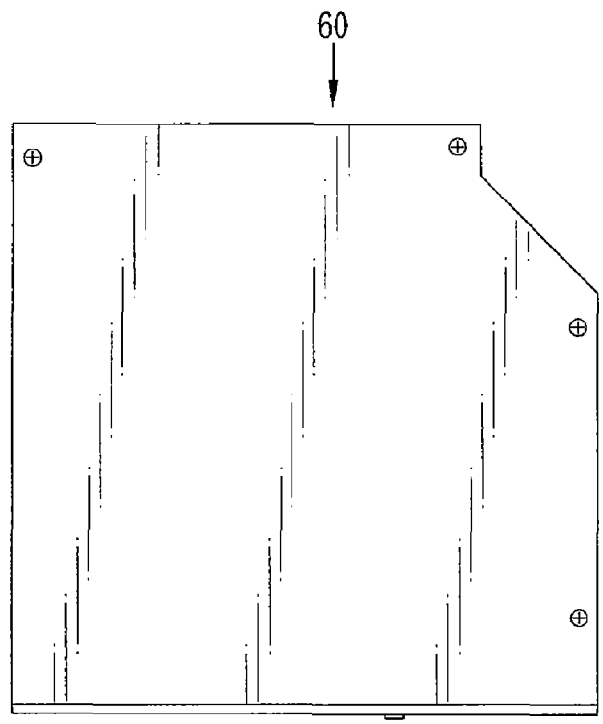
FIG. 20 is a plan illustrating the disk device.
Figure 21:
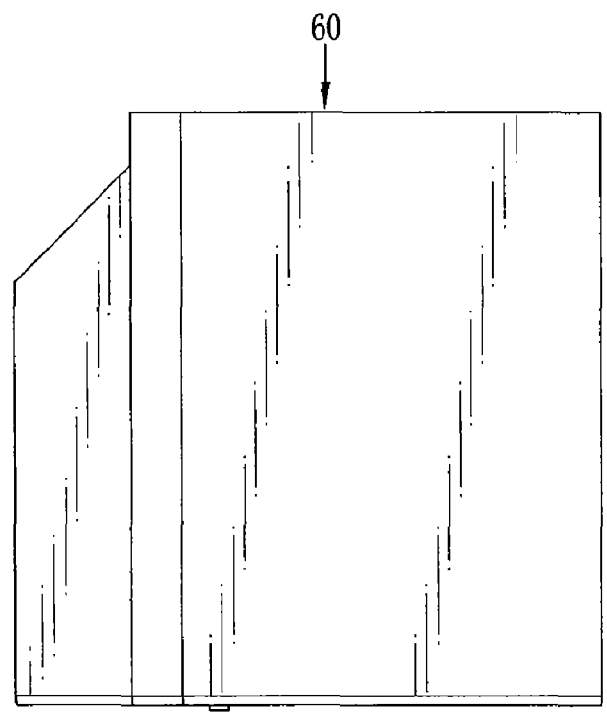
FIG. 21 is a bottom plan illustrating the disk device.
Figure 22:
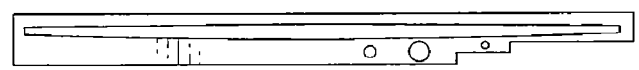
FIG. 22 is a front elevation illustrating the disk device.
Figure 23:
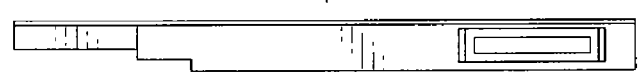
FIG. 23 is a rear elevation illustrating the disk device.
Figure 24:
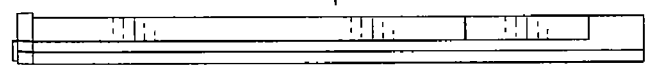
FIG. 24 is a right side elevation illustrating the disk device.
Figure 25:
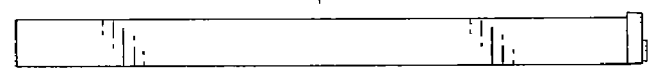
FIG. 25 is a left side elevation illustrating the disk device.

In FIGS. 10-12, the body case 7 includes a main containing region 31 as tray containing region, a rail containing region 32 as intermediate containing region, and a peripheral containing region 33 as disk containing region. The main containing region 31 contains the reader/writer 18 of the tray unit 5. The rail containing region 32 extends from a side of the main containing region 31, and contains the right guide rail 12 and the right slide rail 14. The peripheral containing region 33 extends from a side of the rail containing region 32, and contains a small portion of the disk 4 beyond edges of the main and rail containing regions 31 and 32. The rail containing region 32 has a lower surface 2.5 mm higher than that of the main containing region 31 for maintaining a space in view of other relevant parts incorporated in the computer main unit 3a. The peripheral containing region 33 has a lower surface 2.1 mm higher than that of the rail containing region 32 for space saving (4.6 mm if viewed totally). In the embodiment, a card reader 35a is disposed under the rail containing region 32. A memory card 35 or PC card is inserted through a card slot (not shown) in a lateral surface of the computer main unit 3a and loaded in the card reader 35a. Note that a thickness (height) of the main containing region 31 is 9.5 mm.

The main containing region 31 has a first base wall 31d, a left wall 31a, a rear wall 31b and a first riser wall 31c. The left wall 31a, the first riser wall 31c, and the rear wall 31b are combined to surround the first base wall 31d. A front side of the main containing region 31 has a front opening to allow the tray unit 5 to move in and out. An upper portion of the left wall 31a is bent vertically, has an L shape when viewed in a section, and supports the upper cover 8. A cutout 31e is formed in the rear wall 31b for entry of the connector 37. A second base wall 32a of the rail containing region 32 extends from the first riser wall 31c.

The rail containing region 32 has a second riser wall 32b and a rear wall 32c which extend upright from the second base wall 32a. The second riser wall 32b has a rear end portion with a great height and a remaining portion with a small height. A third base wall 33a of the peripheral containing region 33 extends from the second riser wall 32b. The rear wall 32c extends from the rear wall 31b. One rear end portion of the second riser wall 32b, located at a corner of the rear wall 32c, is bent vertically for supporting the upper cover 8.

A side wall 33b is included in the peripheral containing region 33 and extends upright from the third base wall 33a. The side wall 33b has a rear portion partially cut out. An upper portion of the side wall 33b is bent perpendicularly for supporting the upper cover 8. As a base panel of the body case 7 is finished by bending on two lines for the three containing regions 31-33, its strength is higher than that with a flat form or finished by bending on one line. This can reduce flexing of the housing 9 during assembly of the disk device 2 into the computer main unit 3a.

Screw holes 34a, 34b, 34c and 34d are formed in edge portions of the main containing region 31, the rail containing region 32 and the peripheral containing region 33 for helical engagement of the screws 10a-10d of FIG. 2. The upper cover 8 extends to cover the three containing regions 31, 32 and 33 of the body case 7. Edge portions of the upper cover 8 except for its front portion are bent downwards, and are fitted on outer surfaces of the left wall 31a, the rear wall 31b, the rear wall 32c and the side wall 33b when the upper cover 8 is secured to the body case 7.

The operation of the disk device 2 is described now. To load or unload the disk 4, the tray unit 5 is set in the open position. The disk 4 is coupled with the chuck head 27, before the front bezel 6 is depressed. The disk tray 17 is moved together with the right and left slide rails 13 and 14 in the inward direction while guided by the right and left guide rails 11 and 12. When the disk tray 17 comes to the closed position, the disk 4 is set in the loading position. The tray unit 5 is locked in a state contained in the housing 9. While the disk 4 rotates, the optical pickup 19 records or plays back data with the disk 4 during its radial shift.

To pull the tray unit 5 to the open position, the eject button 6a on the front bezel 6 is depressed. In response, the tray unit 5 is unlocked and protruded by an ejection spring as much as 10 mm. Then a user manually pinches the front bezel 6 to move the disk tray 17 outwards. The right and left slide rails 13 and 14 move together with the disk tray 17. Each projection 14a of the right and left slide rails 13 and 14 contacts the ridge 12a of the right and left guide rails 11 and 12 to disable further slide. Furthermore, the disk tray 17 is moved outwards to the open position of FIGS. 1 and 10. Then the projection 14b of the right and left slide rails 13 and 14 operates to prevent the disk tray 17 from moving.

In FIG. 12, the card reader 35a is installed under the disk device 2, and has one portion positioned under the rail containing region 32. The card reader 35a is loaded with the memory card 35. Should the rail containing region 32 not be present, the card reader 35a may protrude to the right or downwards in the drawing, to enlarge the total size of the computer main unit 3a. Note that various parts can be disposed under the rail containing region 32 in addition to the card reader 35a, so that the form of the rail containing region 32 is effective in preventing enlargement of the computer main unit 3a irrespective of kinds of parts present under the rail containing region 32.

In FIG. 12, the left guide rail 11 and the left slide rail 13 have a greater size in the vertical direction than in the horizontal direction, and are oriented vertically to support the left slide ridge 17a of the disk tray 17. The right guide rail 12 and the right slide rail 14 have a greater size in the horizontal direction than in the vertical direction, and are oriented horizontally to support the right slide ridge 17b of the disk tray 17. Thus, the disk tray 17 can be prevented during movement from fluctuating both vertically and horizontally, especially in the course of moving out.

2nd Embodiment

In FIGS. 13, 14, 15, 16 and 17, a disk device 40 or a disk drive of a second preferred embodiment is illustrated. The first preferred embodiment is repeated with a difference in a moving direction of the optical pickup 19. Elements similar to those of the above embodiment are designated with identical reference numerals.

The disk device 40 includes a housing 42 and a tray unit 41. The housing 42 is constituted by a body case 43 and an upper cover 44, and has a box shape of a quadrilateral. Screws 45a, 45b, 45c and 45d fasten the upper cover 44 to the body case 43. A front bezel 46 is secured to a front face of the tray unit 41. The front bezel 46 includes an eject button 46a, an indicator 46b and an emergency hole 46c.

A disk tray 48 is combined with the reader/writer 18 to constitute the tray unit 41. The disk tray 48 has a right ridge 48b and a left ridge 48a. The cover plate 22 is so secured to the disk tray 48 that the slide channel 21 extends from the shaft of the spindle motor 20 toward a rear left side (diagonally in a loading direction). The thread motor 24 is disposed on the left side from the center of the spindle motor 20.

The body case 43 includes a main containing region 51 as tray containing region, a rail containing region 52 as intermediate containing region, and a peripheral containing region 53 as disk containing region. The rail containing region 52 has a lower surface 2.5 mm higher than that of the main containing region 51. The peripheral containing region 53 has a lower surface 2.1 mm higher than that of the rail containing region 52. A relevant component, such as the card reader 35a, is attached according to space saving with the rail containing region 52. A thickness (height) of the main containing region 51 is 9.5 mm.

The main containing region 51 has a first base wall 51f, a left wall 51a, a rear wall 51b, a rear right wall 51c, a first riser wall 51d and a connection wall 51e. The connection wall 51e connects the first riser wall 51d with the rear right wall 51c. The first base wall 51f is surrounded by those remaining walls. The left wall 51a is in an L-shape as viewed in a section. An insertion channel 51g is formed in the rear wall 51b for entry of the connector 37. The connector 37 is disposed between the rear wall 51b and the connection wall 51e. A second base wall 52a of the rail containing region 52 extends from the first riser wall 51d. A third base wall 53a of the peripheral containing region 53 and the second base wall 52a extend from the connection wall 51e. An upper portion of a right end part of the rear wall 51b is bent vertically.

A second riser wall 52b extends from the second base wall 52a to constitute the rail containing region 52. A side wall 53b extends from the third base wall 53a to constitute the peripheral containing region 53.

Screw holes 54a, 54b, 54c and 54d are formed in the body case 43 for helical engagement with the screws 45a-45d. The upper cover 44 extends to cover the three containing regions 51, 52 and 53 of the body case 43, and is fitted on an outer side of the left wall 51a, the rear wall 51b, the rear right wall 51c and the side wall 53b when secured to the body case 43.

The thread motor 24 is disposed on a left side from the center of the spindle motor 20. A space defined under the rail containing region 52 can be larger than that in a structure where the thread motor 24 would be disposed on a right side from the center of the spindle motor 20, because a horizontal width of the rail containing region 52 is enlarged. Consequently, the lower space can be utilized for a greater number of purposes.

3rd Embodiment

A disk device 60 of a slot-in type or a disk drive according to a third preferred embodiment is illustrated in FIGS. 18-29. Elements similar to those of the above embodiment are designated with identical reference numerals.

In FIGS. 18, 19, 20, 21, 22, 23, 24 and 25, the disk device 60 includes a housing 61 and a front bezel 62 or outer bezel attached to the front of the housing 61. The front bezel 62 includes an insertion slot 62a, an eject button 62b, an indicator 62c and an emergency hole 62d. The insertion slot 62a receives insertion of the disk 4.

The housing 61 includes a body case 65 and an upper cover 66. Screws 63a, 63b, 63c and 63d fasten the upper cover 66 to the body case 65.

A projection or thick wall portion is formed with a center portion of an upper inner surface of the upper cover 66. The thick wall portion receives the disk 4 upon chucking.

Figure 26:
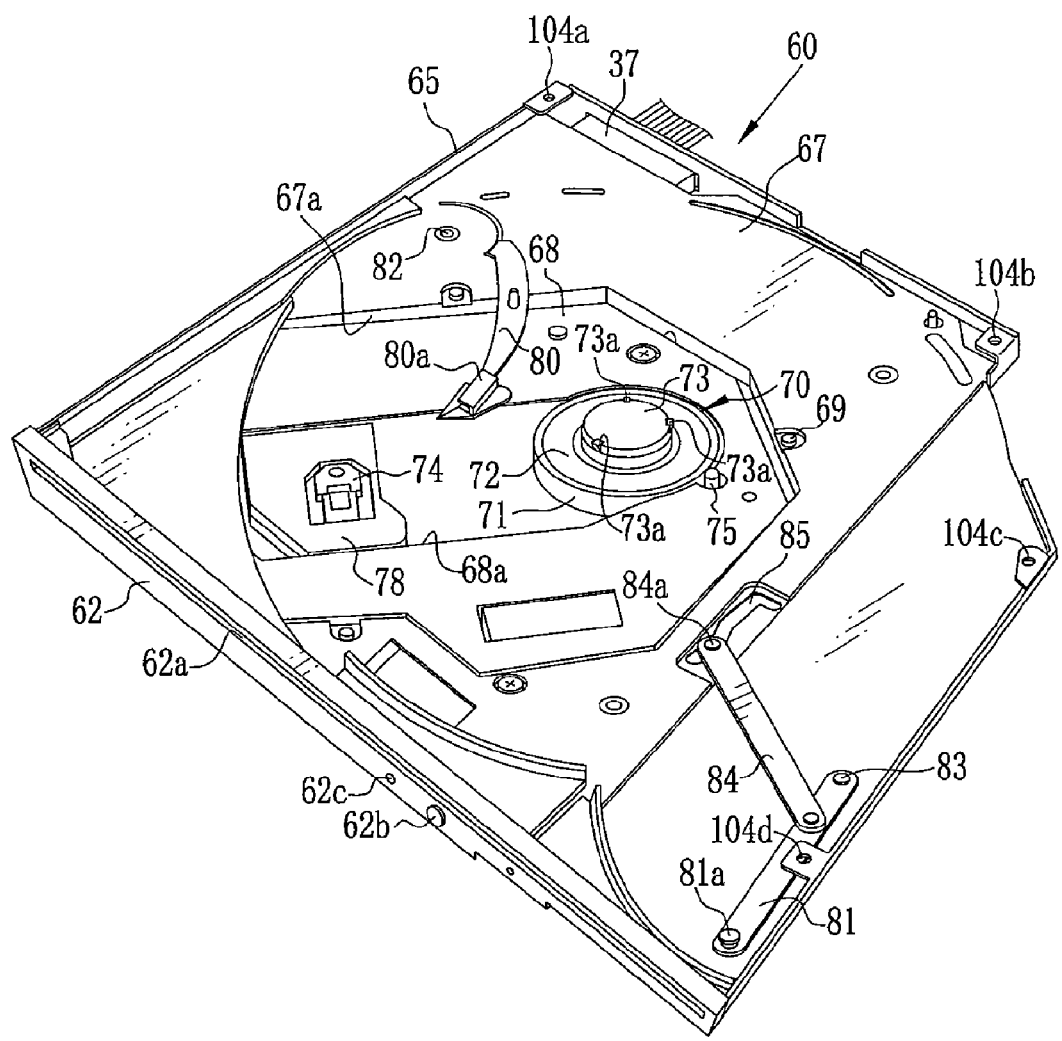
FIG. 26 is a perspective view illustrating the disk device.
Figure 27:
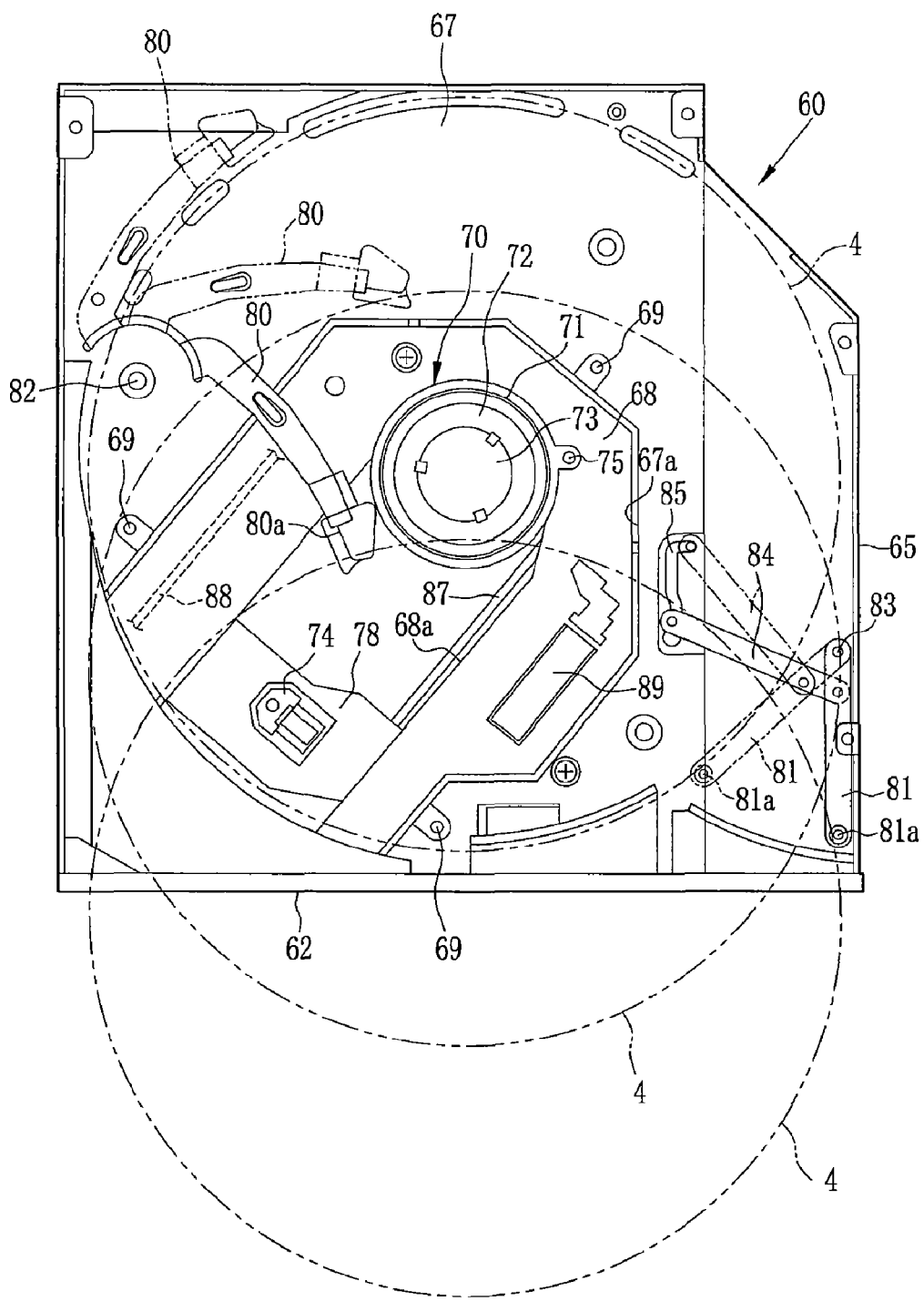
FIG. 27 is a plan illustrating the disk device.

In FIGS. 26 and 27, a base panel 67 is fixed inside the housing 61 to split its inner space vertically. An opening 67a is formed in the base panel 67, and extends diagonally from the center. A lifting frame 68 is disposed in the opening 67a. A cushioning mechanism 69 of a known structure secures the lifting frame 68 to the base panel 67 at plural points. To load the housing 61 with the disk 4 or unload the disk 4 from the housing 61, the lifting frame 68 moves pivotally about a point at the front bezel 62 to shift its frame end up or down near to the center of the disk device. A slide channel 68a is formed in the lifting frame 68, and extends diagonally from the center.

A reader/writer 70 is secured to the frame end part of the lifting frame 68. The reader/writer 70 includes a spindle motor 71, a turntable 72, a chuck head 73 and an optical pickup 74 or pickup head. The spindle motor 71 is secured to a rear surface of the lifting frame 68. The turntable 72 is an upper wall of a casing to contain the spindle motor 71. The chuck head 73 is secured to the turntable 72. When the lifting frame 68 moves up, the chuck head 73 enters the center hole 4a of the disk 4 in a chuck position. Plural chuck claws 73a are incorporated in the chuck head 73, and biased by a spring externally to retain the disk 4 removably. A dechucking pin 75 or release pin receives the disk 4 upon moving down the lifting frame 68 to remove the disk 4 from the chuck head 73.

A head carriage 78 appears through the slide channel 68a in the lifting frame 68, and supports the optical pickup 74. To record or play back data, the head carriage 78 slides within the slide channel 68a.

A load arm 80 or disk support arm and a guide arm 81 are disposed on the base panel 67. The load arm 80 moves the disk 4 in and out. The guide arm 81 moves the disk 4 from the insertion slot 62a into the housing 61. In the load arm 80, an edge holder 80a is engaged with a distal edge of the disk 4, and moves pivotally about a shaft 82. A flange roller 81a of the guide arm 81 is coupled with a proximal edge of the disk 4, and moves pivotally about a shaft 83. A link lever 84 is disposed to move the guide arm 81 pivotally. A cam pin 84a of the link lever 84 is moved along a cam groove 85.

Note that plural positions of the disk 4 are illustrated in FIG. 27, including the unloading position, a start position for automatic transport, and the loading position after completing the chucking.

Figure 28:
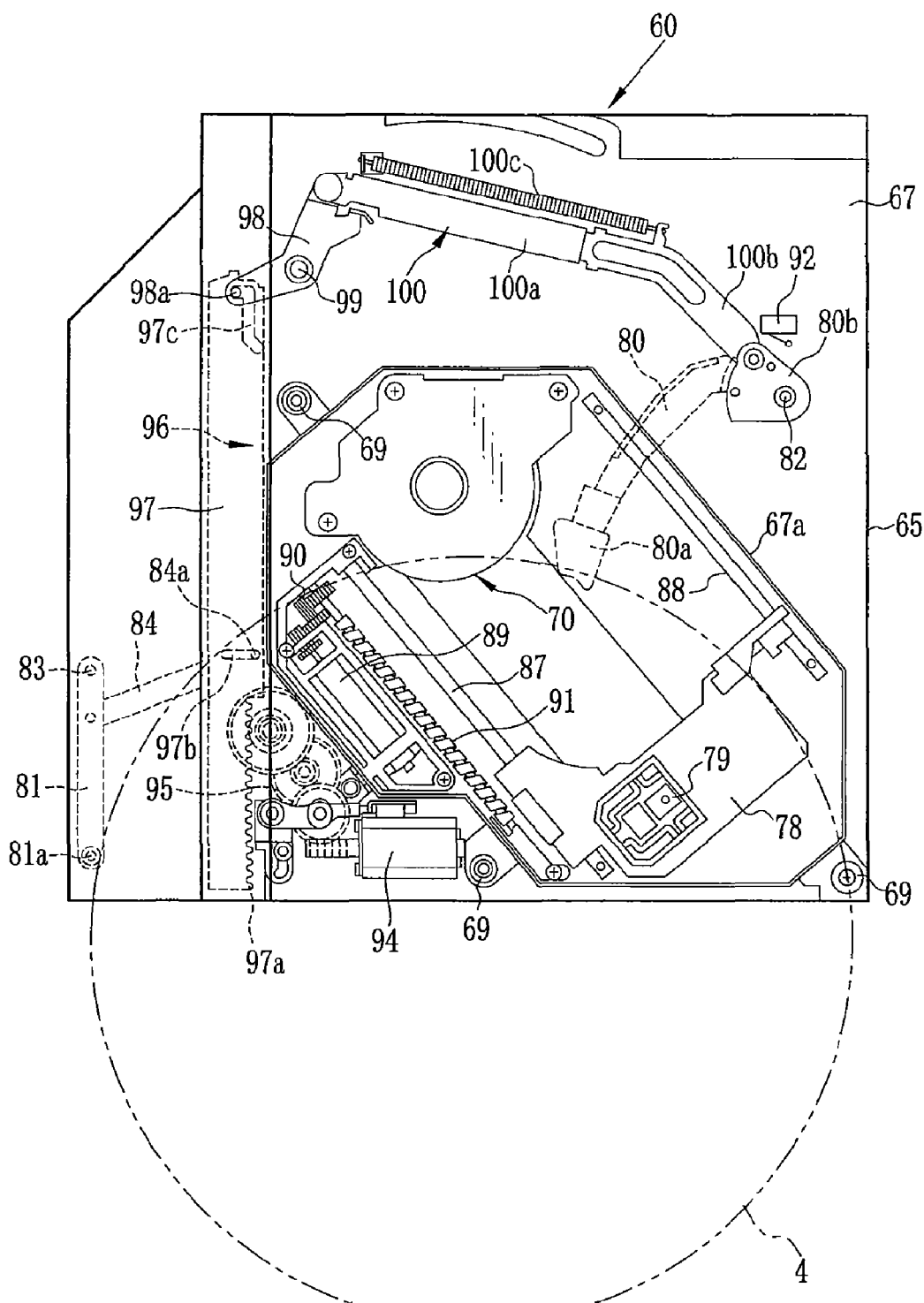
FIG. 28 is a bottom plan illustrating the disk device.

In FIG. 28, guide shafts 87 and 88 support the head carriage 78 with the optical pickup 74. Ends of the guide shafts 87 and 88 are fixedly secured to the rear of the lifting frame 68. There is a threaded shaft 91 or screw shaft. A gear train 90 transmits rotations of a thread motor 89 to the threaded shaft 91. The head carriage 78 is moved back and forth by the rotations of the threaded shaft 91.

A loading motor 94 is disposed behind the base panel 67. A gear train 95 is connected with an output shaft of the loading motor 94. A disk moving mechanism 96 is driven by means of the gear train 95 transmitting rotation of the loading motor 94, and moves the disk 4 in or out. A loading slider 97 is combined with the load arm 80 and the guide arm 81 to constitute the disk moving mechanism 96.

A rack gear 97a is disposed on one side of the loading slider 97, and is meshed with a final gear included in the gear train 95. The loading slider 97 is slid inwards or outwards along a side of the housing 61 by the rotations of the loading motor 94. The disk 4 is moved into the housing 61 when the loading slider 97 slides inwards from the front bezel 62, and moved out of the housing 61 when the loading slider 97 slides outwards.

A cam groove 97b and a cam groove 97c are formed in the loading slider 97. The cam groove 97b operates to push the cam pin 84a of the link lever 84. The cam groove 97c actuates a link lever 98. The cam groove 97b extends horizontally, and moves the cam pin 84a along the cam groove 85 by pushing the cam pin 84a in a direction of moving the loading slider 97. Also, a cam groove (not shown) is formed in a lateral face of the loading slider 97 for moving up and down the lifting frame 68.

A cam pin 98a protrudes from the link lever 98, and is engaged with the cam groove 97c in the loading slider 97. There is a shaft 99 about which the link lever 98 rotates when the loading slider 97 moves. A base plate 80b is connected with the link lever 98 by a link arm structure 100. The base plate 80b is connected by the shaft 82 to the load arm 80 disposed on a surface of the base panel 67. A detection switch 92 is disposed near to the base plate 80b, and is turned on when the load arm 80 is rotated by push of the disk 4. The control circuit board (not shown) is caused by a signal from the detection switch 92 to rotate the loading motor 94, to start automatic transport of the disk 4.

The link arm structure 100 includes a first arm 100a, a second arm 100b and a tension coil spring 100c. The second arm 100b is connected with the first arm 100a in a slidable manner. The tension coil spring 100c biases the arms 100a and 100b toward one another for a smallest length. When a user pushes the disk 4 into the housing 61, the link arm structure 100 enables the load arm 80 to move pivotally without actuating the link lever 98 until a start of automatic transport.

Figure 29:
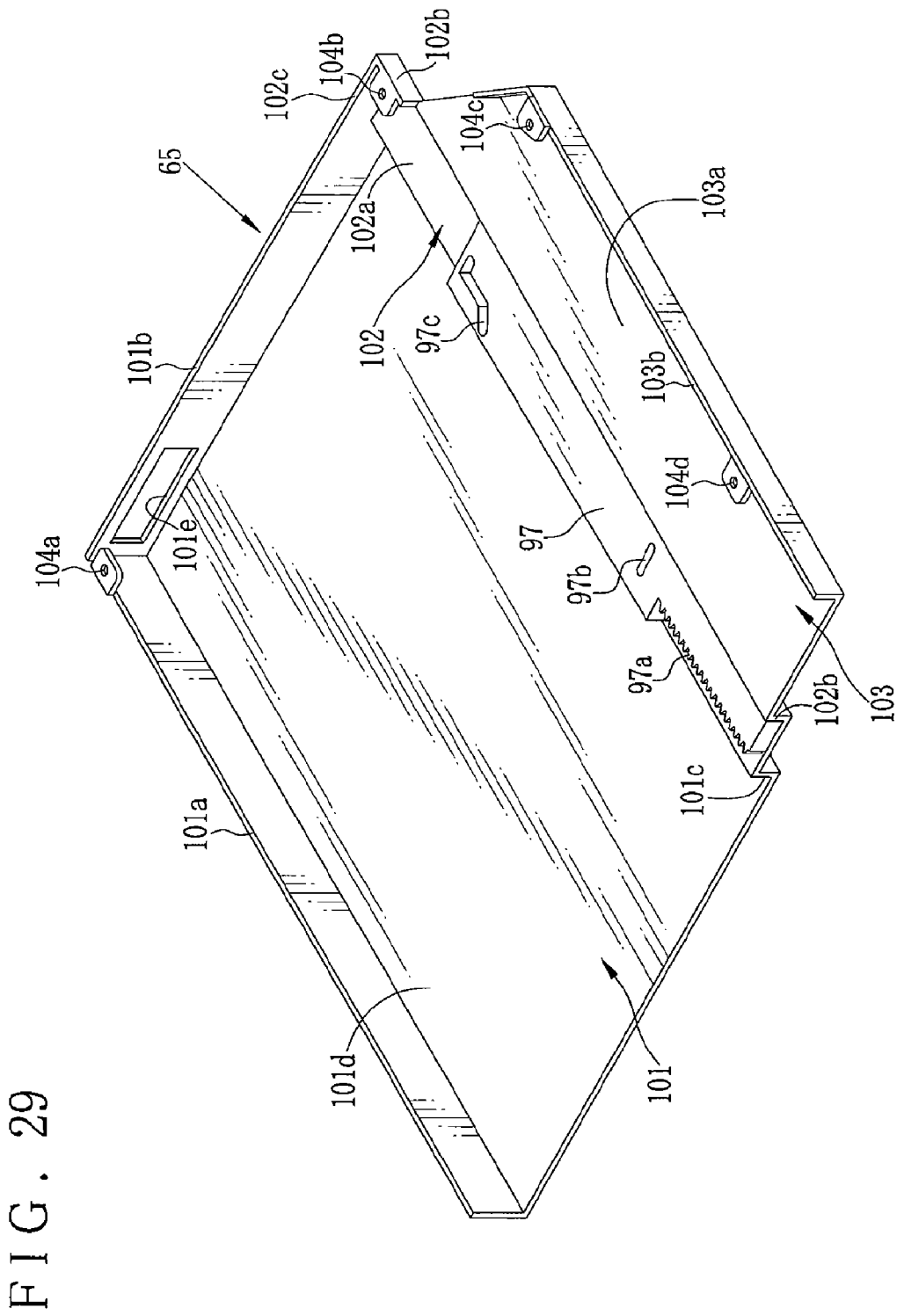
FIG. 29 is a perspective view illustrating a body case and a loading slider of the disk device.
Figure 30:
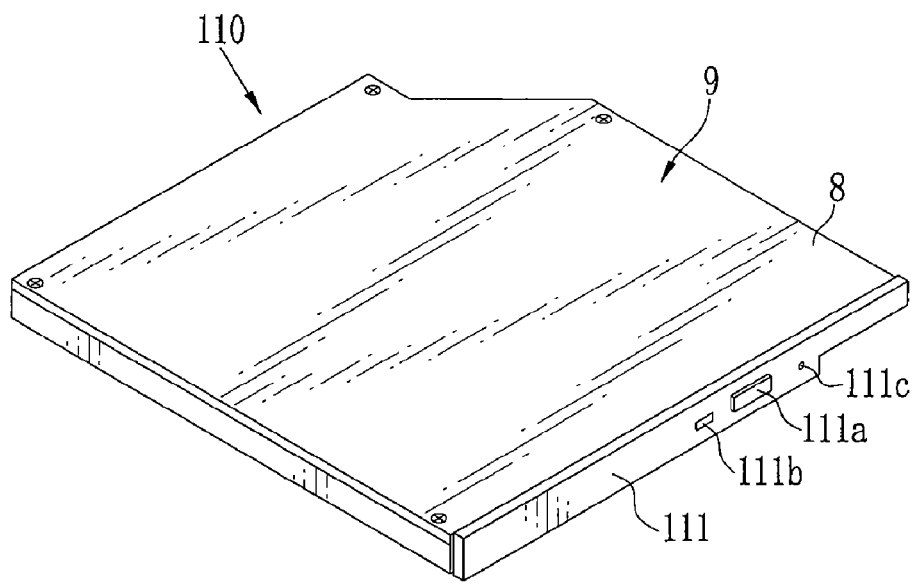
FIGS. 30, 31, 32, 33, 34, 35, 36 and 37 are views illustrating a fourth preferred disk device of a tray type.
Figure 31:
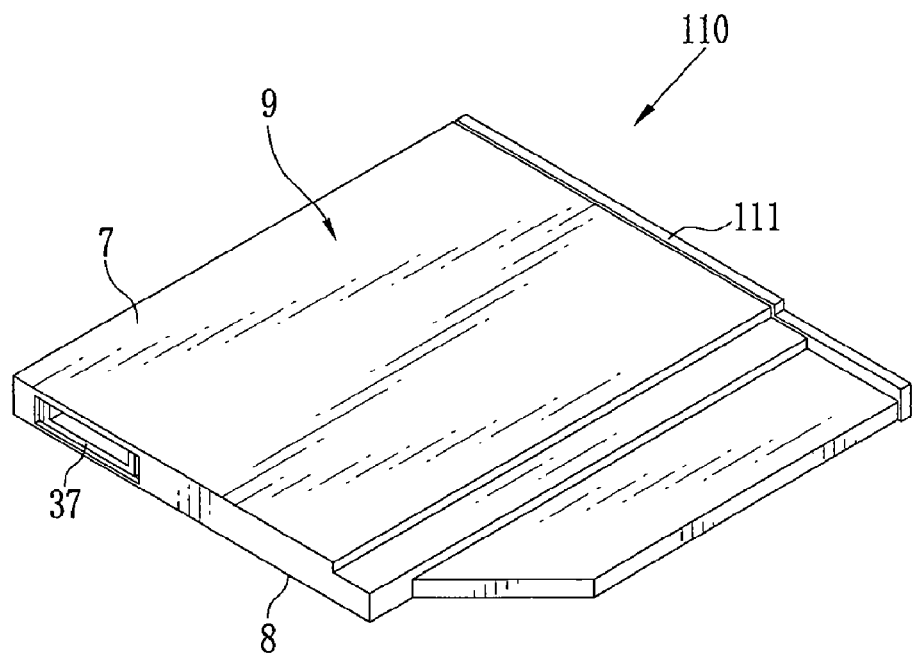
Figure 32:
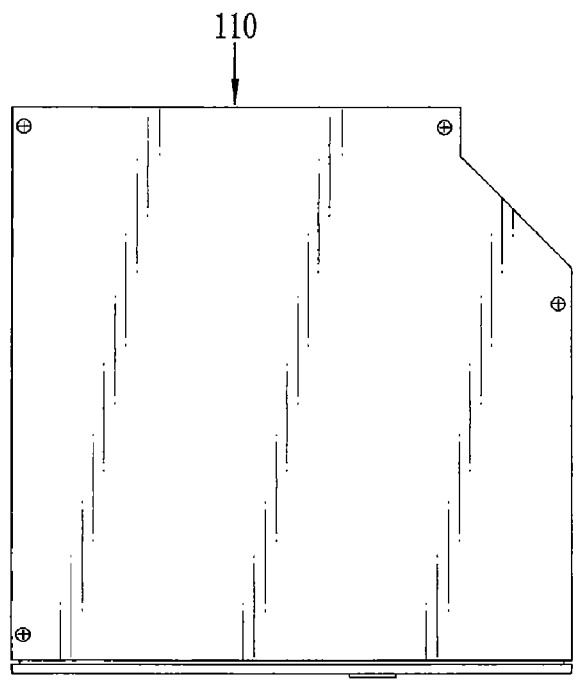
Figure 33:
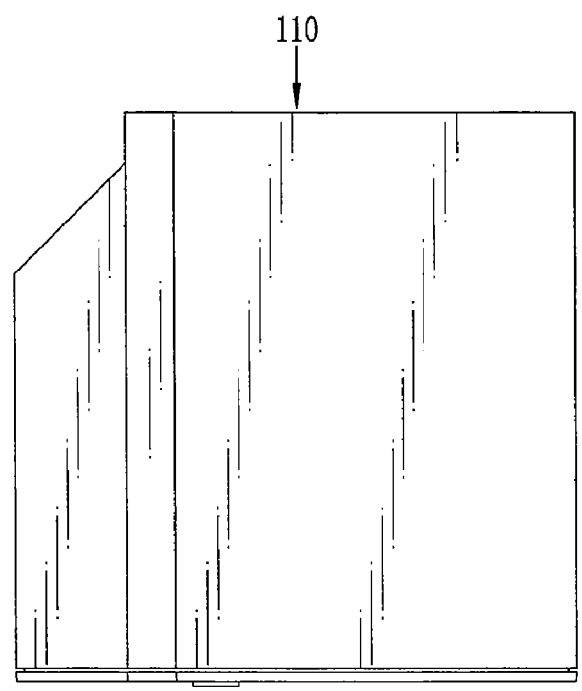
Figure 34:
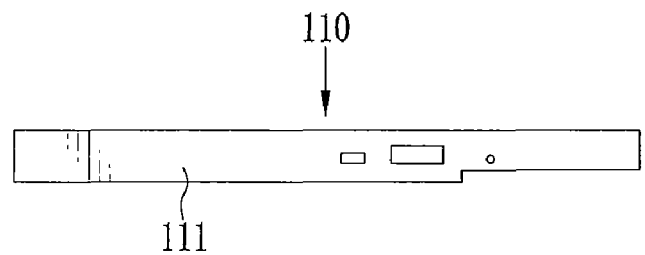
Figure 35:
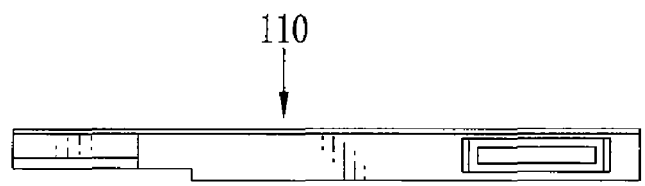
Figure 36:
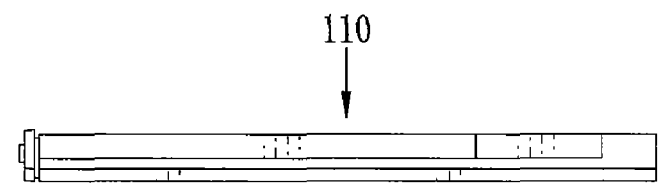
Figure 37:
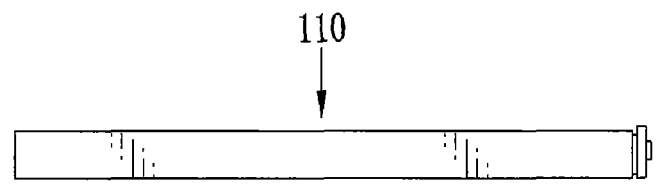
Figure 38:
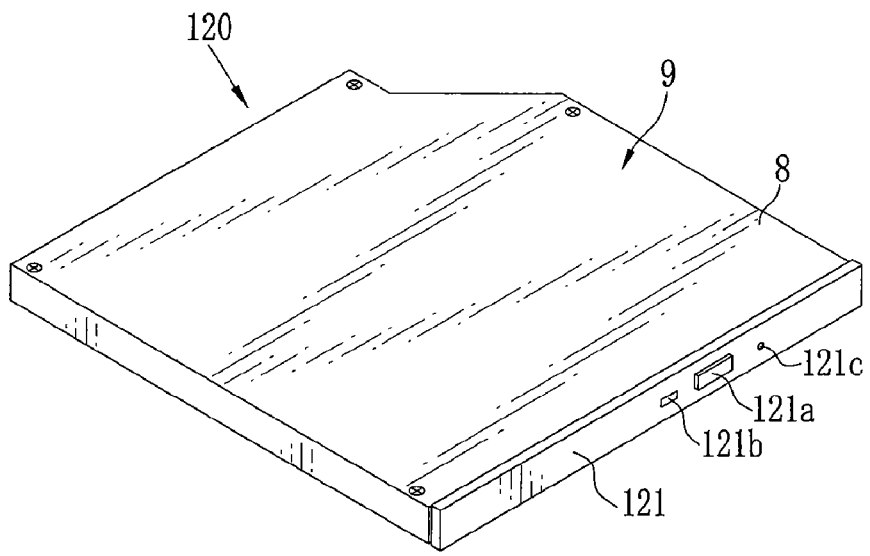
FIGS. 38, 39, 40, 41, 42, 43, 44 and 45 are views illustrating a fifth preferred disk device of a tray type.
Figure 39:
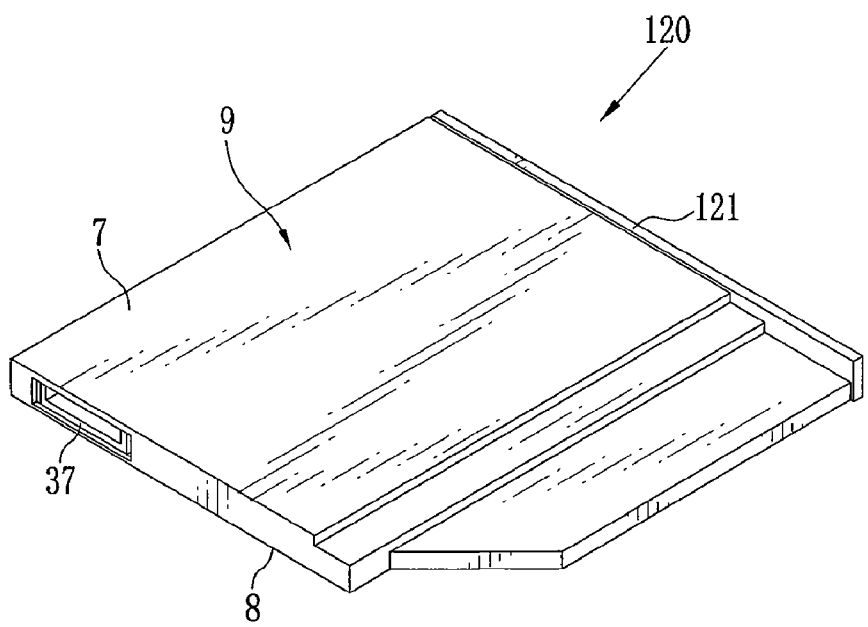
Figure 40:
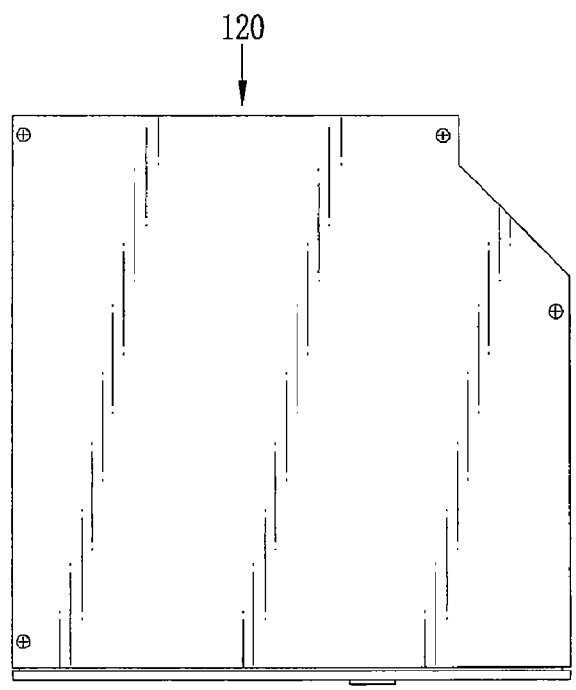
Figure 41:
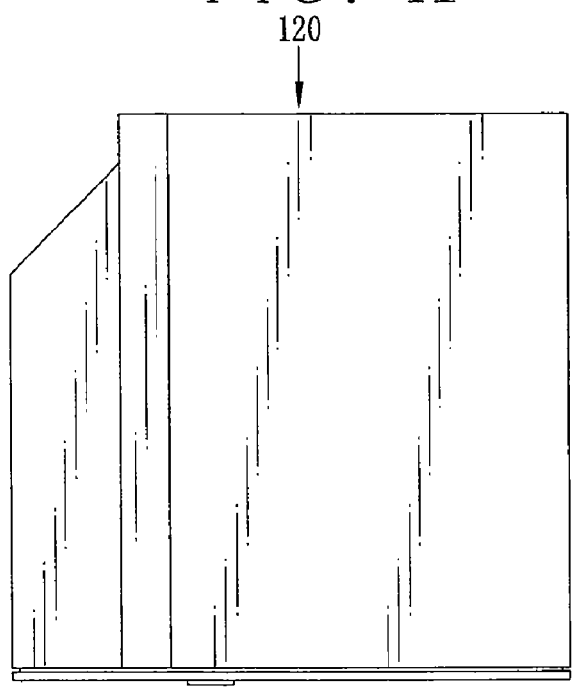
Figure 42:
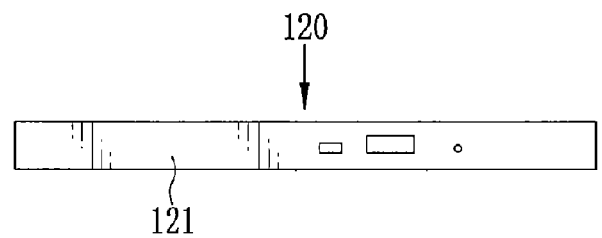
Figure 43:
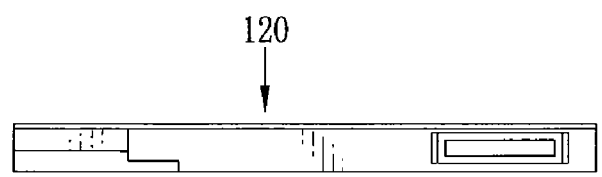
Figure 44:
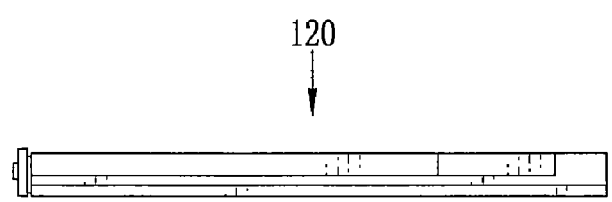
Figure 45:
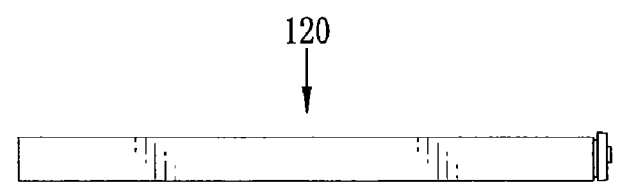
Figure 46:
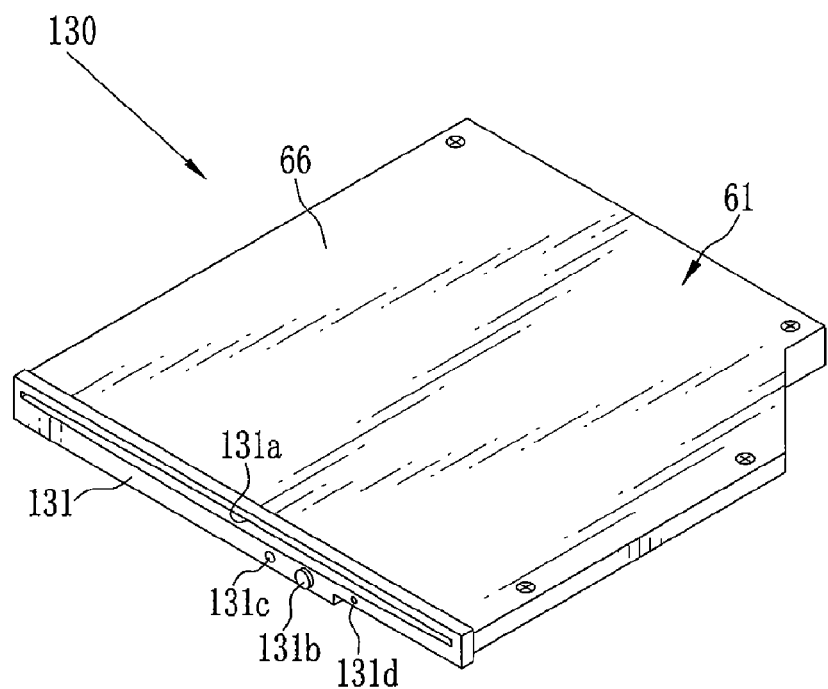
FIGS. 46, 47, 48, 49, 50, 51, 52 and 53 are views illustrating a sixth preferred disk device of a slot-in type.
Figure 47:
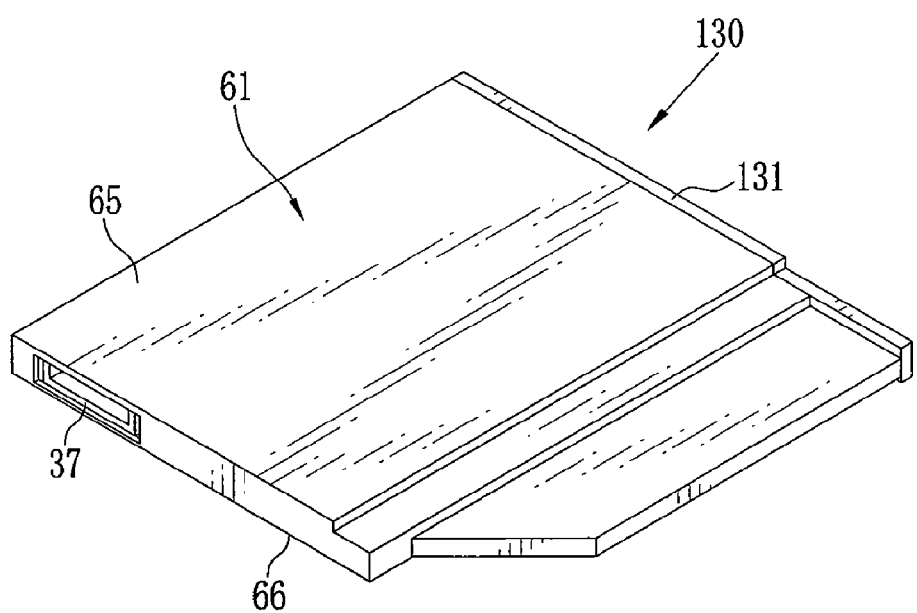
Figure 48:
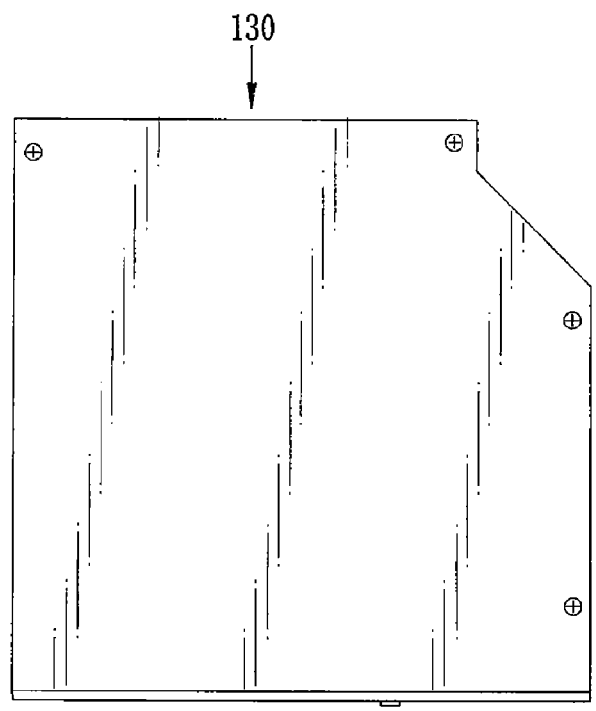
Figure 49:
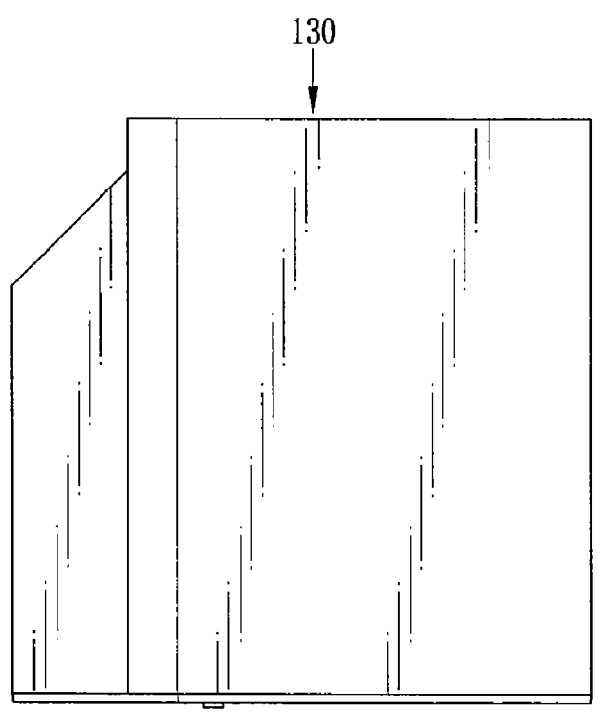
Figure 50:
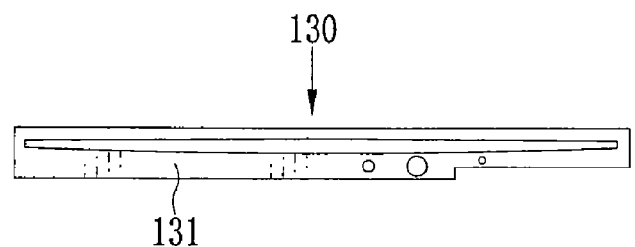
Figure 51:
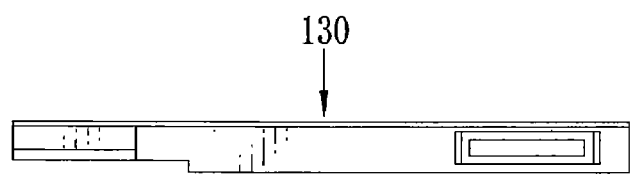
Figure 52:
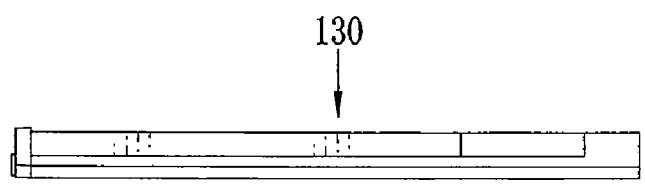
Figure 53:
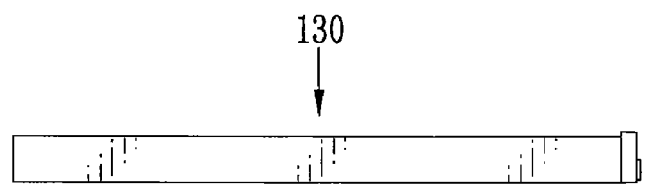
Figure 54:
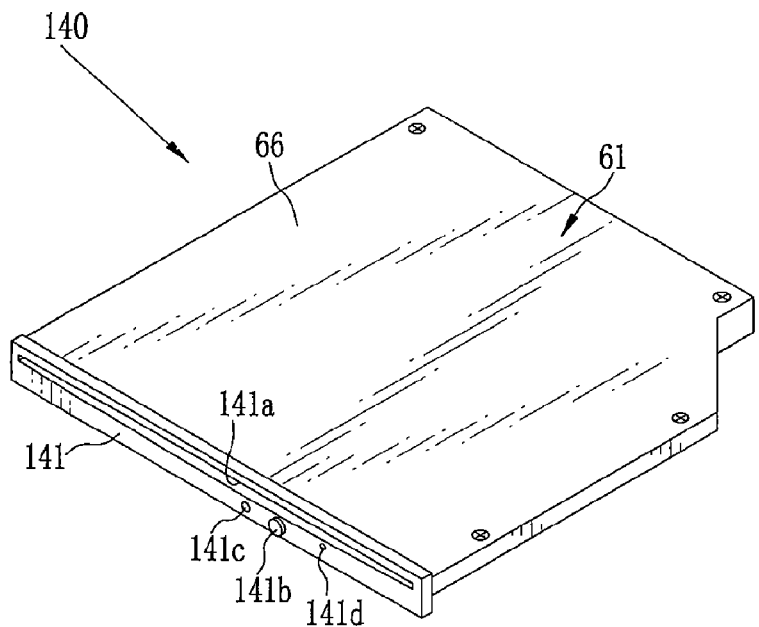
FIGS. 54, 55, 56, 57, 58, 59, 60 and 61 are views illustrating a seventh preferred disk device of a slot-in type.
Figure 55:
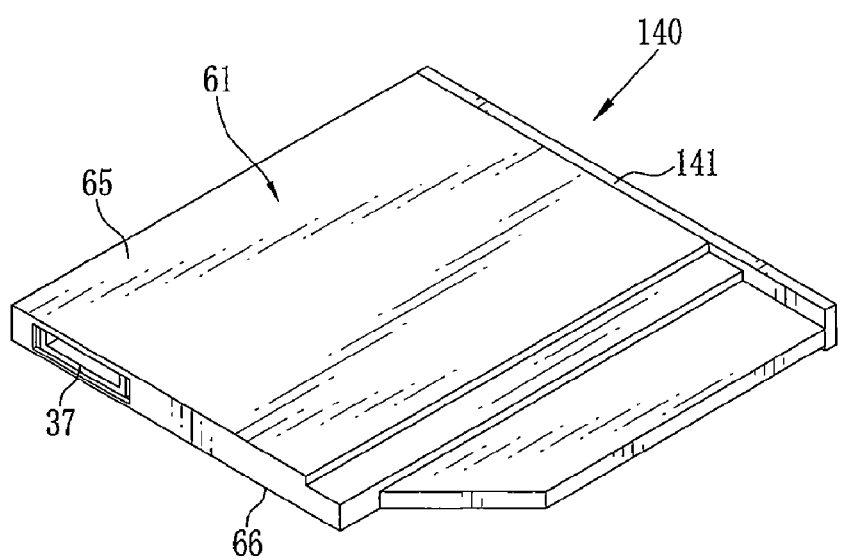
Figure 56:
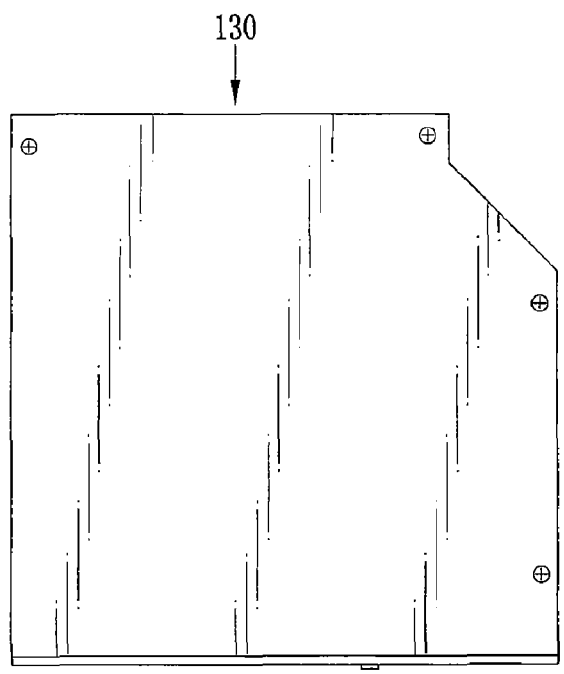
Figure 57:
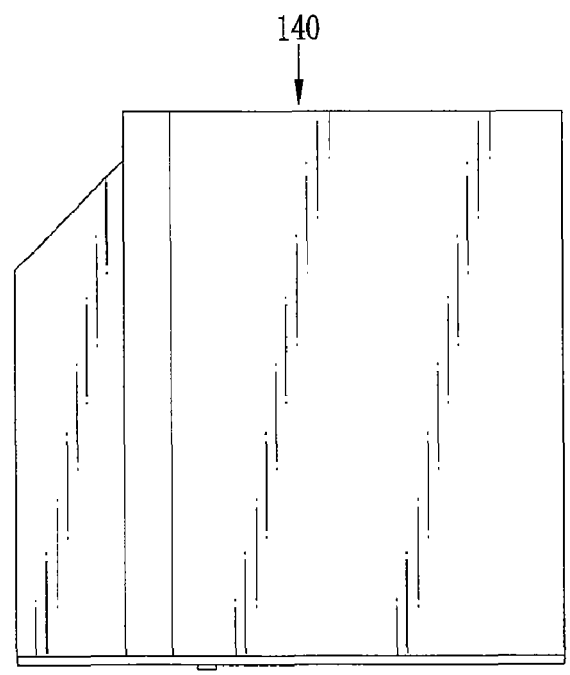
Figure 58:
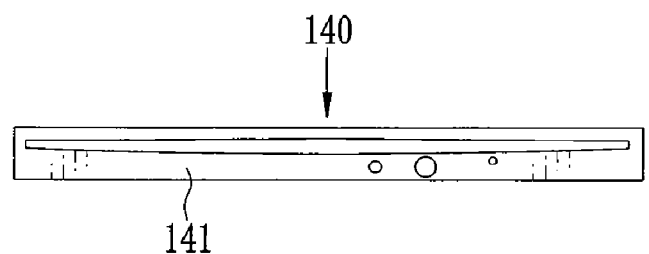
Figure 59:
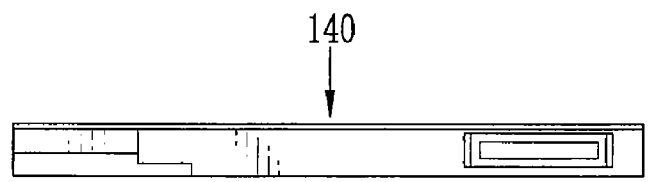
Figure 60:
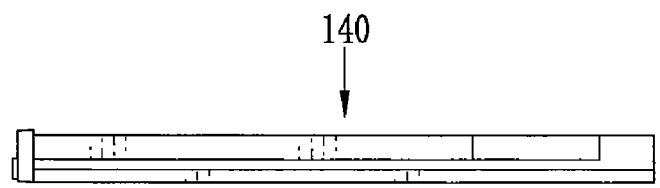
Figure 61:
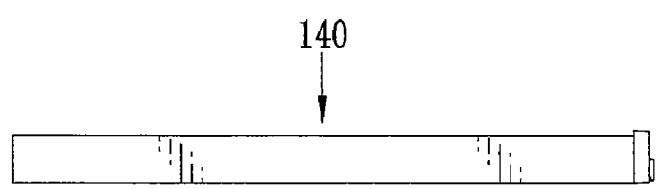

In FIG. 29, the body case 65 includes a main containing region 101 as pickup containing region, a slider containing region 102 as intermediate containing region, and a peripheral containing region 103 as disk containing region. The main containing region 101 contains the reader/writer 70. The slider containing region 102 extends from a side of the main containing region 101, and contains the loading slider 97 included in the disk moving mechanism 96. The peripheral containing region 103 extends from a side of the slider containing region 102, and contains a portion of the disk 4 beyond edges of the main and slider containing regions 101 and 102.

The slider containing region 102 has a lower surface 2.5 mm higher than that of the main containing region 101 for space saving. The peripheral containing region 103 has a lower surface 2.1 mm higher than that of the slider containing region 102 for space saving. In the embodiment, a card reader (not shown) is disposed under the slider containing region 102. Note that a thickness (height) of the main containing region 101 is 9.5 mm.

The main containing region 101 has a first base wall 101d, a left wall 101a, a rear wall 101b and a first riser wall 101c. The left wall 101a, the first riser wall 101c and the rear wall 101b are combined to surround the first base wall 101d. A front side of the main containing region 101 has a front opening to allow the disk 4 to move in and out. A rear end portion of the left wall 101a is bent vertically, has an L shape when viewed in a section, and supports the upper cover 66. A through hole 101e is formed in the rear wall 101b for entry of the connector 37. A second base wall 102a of the slider containing region 102 extends from the first riser wall 101c.

A second riser wall 102b and a rear wall 102c extend upright from the second base wall 102a of the slider containing region 102. Only a rear end portion of the second riser wall 102b has a large height. A remaining portion of the second riser wall 102b has a smaller height. A third base wall 103a of the peripheral containing region 103 extends from the second riser wall 102b. The rear end portion of the second riser wall 102b, located at a corner of the rear wall 102c, is bent vertically for supporting the upper cover 66. The rear wall 102c extends from the rear wall 101b of the main containing region 101.

A side wall 103b extends upright from the third base wall 103a of the peripheral containing region 103. The side wall 103b has a rear portion partially cut out. An upper portion of the side wall 103b is partially bent for supporting the upper cover 66.

Screw holes 104a, 104b, 104c and 104d are formed in edge portions of the main containing region 101, the slider containing region 102 and the peripheral containing region 103 for helical engagement of the screws 63a-63d. The upper cover 66 when secured to the body case 65 is fitted on its outer surfaces.

In operation, the disk 4 is inserted at first through the insertion slot 62a of the front bezel 62. See FIGS. 27 and 28. A distal edge of the disk 4 is engaged with the edge holder 80a of the load arm 80. As the disk 4 advances, the link arm structure 100 is extended while the load arm 80 rotates in the clockwise direction in FIG. 28 about the shaft 82 together with the base plate 80b.

When the load arm 80 is pushed further, the base plate 80b turns on the detection switch 92. The loading motor 94 starts rotation in response to a signal from the detection switch 92. Rotations of the loading motor 94 are transmitted by the gear train 95 to the loading slider 97. The loading slider 97 slides in a loading direction and away from the front bezel 62.

When the loading slider 97 slides in, an edge of the cam groove 97b pushes the cam pin 84a of the link lever 84, which moves along the cam groove 85. Thus, the link lever 84 swings, to move the guide arm 81 pivotally about the shaft 83 in a clockwise direction in FIG. 27. The flange roller 81a at an end of the guide arm 81 pushes a proximal edge of the disk 4.

The cam groove 97c in the loading slider 97 rotates the link lever 98 in the clockwise direction in FIG. 28. A rotation of the link lever 98 is transmitted by the link arm structure 100 to the base plate 80b, and causes the load arm 80 to rotate in the clockwise direction in FIG. 28. Thus, the disk 4 is engaged with the load arm 80 and the guide arm 81 and moved into the housing 61.

When the disk 4 comes to the chuck position directly short of the loading position in FIG. 27, the center hole 4a of the disk 4 is registered with the chuck head 73. The lifting frame 68 is moved up by the loading slider 97, to enter the chuck head 73 in the center hole 4a in the disk 4. So the chuck claws 73a chuck the disk 4. The disk 4 is received by an inner projection inside the upper cover 66 upon moving up by the chuck head 73. After the chucking, the lifting frame 68 moves down slightly to separate the disk 4 from the upper cover 66.

During the chucking operation, the load arm 80 and the guide arm 81 are stationary. After chucking, those move away from the disk 4 with a final portion of the stroke of the loading slider 97, to release the disk 4. The loading slider 97 turns on a switch (not shown) in response to release of the load arm 80 and the guide arm 81, the loading motor 94 is made inactive to terminate advance of the disk 4.

When the disk 4 is chucked, the spindle motor 71 rotates. In response, the disk 4 is rotated at a high speed by the turntable 72 and the chuck head 73. The optical pickup 74 shifts radially with respect to the disk 4 during the rotation, to record or play back data.

If a user wishes to move out the disk 4 from the housing 61, the eject button 62b of the front bezel 62 is depressed, or a command signal for actuation is input by an external device to the disk device 60. The control circuit board (not shown) stops the spindle motor 71 at first. Then the loading motor 94 is caused to rotate in the backward direction. This causes the loading slider 97 to slide toward the front bezel 62, namely outwards in the unloading direction.

When the loading slider 97 starts sliding, the load arm 80 and the guide arm 81 move slightly in a pivotal manner, to retain an edge of the disk 4. Then the lifting frame 68 moves down. In the course of the movement, the disk 4 becomes received by the dechucking pin 75, and can be removed from the chuck head 73. After moving down, the load arm 80 and the guide arm 81 move again pivotally, to move out the disk 4 to the unloading position of FIG. 28.

4th Embodiment

In FIGS. 30, 31, 32, 33, 34, 35, 36 and 37, a fourth preferred embodiment is illustrated. A disk device 110 of a tray type or a disk drive has a front bezel 111 with a quadrilateral cutout. An eject button 111a, an indicator 111b and an emergency hole 111c are disposed in the front bezel 111. The first preferred embodiment is repeated in the fourth only with a difference of the front bezel 111.

5th Embodiment

In FIGS. 38, 39, 40, 41, 42, 43, 44 and 45, a fifth preferred embodiment is illustrated. A disk device 120 of a tray type or a disk drive has a front bezel 121 of a flat shape without a corner cutout. An eject button 121a, an indicator 121b and an emergency hole 121c are disposed in the front bezel 121. The first preferred embodiment is repeated in the fifth only with a difference of the front bezel 121.

6th Embodiment

In FIGS. 46, 47, 48, 49, 50, 51, 52 and 53, a sixth preferred embodiment is illustrated. A disk device 130 of a slot-in type or a disk drive has a front bezel 131 with a quadrilateral cutout. An insertion slot 131a, an eject button 131b, an indicator 131c and an emergency hole 131d are disposed in the front bezel 131. The third preferred embodiment is repeated in the sixth only with a difference of the front bezel 131.

7th Embodiment

In FIGS. 54, 55, 56, 57, 58, 59, 60 and 61, a seventh preferred embodiment is illustrated. A disk device 140 of a slot-in type or a disk drive has a front bezel 141 of a flat shape without a corner cutout. An insertion slot 141a, an eject button 141b, an indicator 141c and an emergency hole 141d are disposed in the front bezel 141. The third preferred embodiment is repeated in the seventh only with a difference of the front bezel 141.

Note that the guide rail and the slide rail are used in the first embodiment, and contained in the rail containing region. However, the guide rail can be unnecessary if the rail containing region is defined to have a portion for supporting the slide rail.

In the first to seventh preferred embodiments, the thickness of the main containing region is 9.5 mm in the disk device. However, it is possible in the invention for a disk device to have thickness (height) of the main containing region of 12.7 mm. Various dimensions or sizes of the main containing region are not limited to the values of the embodiments because of considerable changes in the size of the disk device or its specifications. A disk device of the invention can be modified in the space saving condition with the third thickness of the peripheral containing region smaller than the second thickness of the intermediate containing region which is smaller than the first thickness of the main containing region.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device comprising:
   a disk moving mechanism for moving a disk between loading and unloading positions;
   a reader/writer for recording or playback of data with said disk in said loading position;
   a housing including:
   a main containing region, having a first base wall, for containing said reader/writer;
   an intermediate containing region, disposed to extend from one side of said main containing region, for partially containing said disk moving mechanism, said intermediate containing region having a second base wall positioned higher than said first base wall, to define a space below;
   a peripheral containing region, disposed to extend from one side of said intermediate containing region, for containing a portion of said disk protruded from said intermediate containing region, said peripheral containing region having a third base wall positioned higher than said second base wall, to define a space below.

2. A disk device as defined in claim 1, wherein said reader/writer includes:
   a turntable mechanism for rotating said disk; and
   a pickup for recording or playback of data with said disk.

3. A disk device as defined in claim 2, wherein said housing further includes:
   a first riser wall formed between said first and second base walls to extend erectly;

a second riser wall formed between said second and third base walls to extend erectly.

4. A disk device as defined in claim 1, wherein said disk moving mechanism includes:
- a disk tray, contained in said main and intermediate containing regions in a movable manner in and out, for supporting said disk placed thereon;
- first and second rails for supporting lateral portions of said disk tray, and for guiding said disk tray between a closed position where said disk tray is contained in said housing to set said disk in said loading position, and an open position where said disk tray is pulled out of said housing to set said disk in said unloading position;
- wherein said first rail is disposed in said main containing region, and said second rail is disposed in said intermediate containing region.

5. A disk device as defined in claim 4, wherein said reader/writer is disposed on said disk tray.

6. A disk device as defined in claim 1, wherein said disk moving mechanism includes:
- a motor;
- a loading slider, actuated by said motor, for linearly moving in a direction of moving of said disk; and
- a plurality of arms, caused to rotate by said loading slider, for contacting an edge of said disk entered through an insertion slot on a front side, to move said disk between said loading and unloading positions;
- said intermediate containing region contains said loading slider.

7. A disk device as defined in claim 6, wherein said reader/writer is secured to a surface of said main containing region.

8. A disk device as defined in claim 1, wherein said intermediate containing region extends from a front surface of said housing to a rear surface thereof.

9. A disk device as defined in claim 8, wherein said housing includes:
- a body case having said first, second and third base walls; and
- an upper cover for covering said body case.

10. A disk device as defined in claim 1, wherein said housing includes:
- a body case having said main containing region, said intermediate containing region and said peripheral containing region, and having a front opening directed to a front side;
- a front bezel secured to cover said front opening;
- a cutout formed in said front bezel by recessing one lower corner thereof, having a stepped shape in association with said second and third base walls.

* * * * *